US005539873A

United States Patent [19]

Yoshimori et al.

[11] Patent Number: 5,539,873

[45] Date of Patent: Jul. 23, 1996

[54] PICTURE STORAGE APPARATUS AND GRAPHIC ENGINE APPARATUS

[75] Inventors: Masaharu Yoshimori, Kanagawa; Hiroyuki Ozawa, Tokyo; Hiroshi Hayashi, Kanagawa, all of Japan

[73] Assignee: Sony Corporation, Tokyo, Japan

[21] Appl. No.: 421,473

[22] Filed: Apr. 12, 1995

Related U.S. Application Data

[63] Continuation of Ser. No. 36,658, Mar. 24, 1993.

[30] Foreign Application Priority Data

Mar. 30, 1992 [JP] Japan .................................. 4-102475

[51] Int. Cl.[6] .................................................. G06F 15/16

[52] U.S. Cl. ........................................... 395/163; 395/164

[58] Field of Search .................................... 395/162–166, 395/115, 116, 400, 425, 843, 840, 482–484; 345/24, 27, 133, 185, 201, 203

[56] References Cited

U.S. PATENT DOCUMENTS

| | | | |
|---|---|---|---|
| 4,958,303 | 9/1990 | Assarpour et al. | 364/521 |
| 5,341,486 | 8/1994 | Castle | 395/400 |

FOREIGN PATENT DOCUMENTS

| | | | |
|---|---|---|---|
| 0192139 | 8/1986 | European Pat. Off. | G09G 1/16 |
| 60-113290 | 6/1985 | Japan | G09G 1/06 |
| 61-241859 | 10/1986 | Japan | G06F 13/38 |
| 62-184692 | 8/1987 | Japan | G11C 11/34 |
| 63-180997 | 7/1988 | Japan | G09G 1/16 |
| 63-195696 | 8/1988 | Japan | G09G 1/16 |
| 5-6425 | 1/1993 | Japan | G06F 15/66 |
| WO89/11143 | 11/1989 | WIPO | G09G 1/16 |

OTHER PUBLICATIONS

IEEE Computer Graphics and Applications, May 1991, No. 3. "Window Clipping Methods in Graphics Accelerators" by David Piredo, Hewlett–Packard Co.

*Primary Examiner*—Raymond J. Bayerl
*Assistant Examiner*—Kee M. Tung
*Attorney, Agent, or Firm*—Limbach & Limbach

[57] ABSTRACT

A memory $M_i$ has a storage capacity one-sixteenth of a memory capacity corresponding to the resolution of a display screen. A pixel processor $XP_i$ controls readout and writing of pixel data from or in memory $M_i$ via an input/output port $IO_1$ and finds a number j of the pixel processor $XP_i$ of a destination area of pixel data to transfer pixel data read from memory $M_i$ via TBus 19 to pixel processor $XP_i$ of the destination area in the sequence of an increasing number j. The pixel data stored in memory $M_i$ is read out by raster scanning so as to be converted into RGB signals by a video processing circuit 17. A Braun tube 18 displays a picture based on the RGB signals.

2 Claims, 17 Drawing Sheets

PICTURE STORAGE APPARATUS AND GRAPHIC ENGINE APPARATUS

This is a continuation of co-pending application Ser. No. 08/036,658 filed on Mar. 24, 1993.

BACKGROUND OF THE INVENTION

1. Field of the Invention

This invention relates to a picture storage apparatus and a graphic engine apparatus, such as a display device in a computer graphics system.

2. Description of the Related Art

In a display apparatus employed in a computer graphic system or an engineering workstation, the drawing speed significantly influences the processing capability of the entire system and represents an important factor governing the processing capability. A variety of systems have been developed for elevating the drawing speed. Examples of these systems include a memory interleaving system and a block light system, such as a so-called pixel cache system.

The pixel cache system and the memory interleave system are hereinafter explained.

A display apparatus constructed in accordance with the cache system includes a picture data generator 1 for decoding the commands and generating pixel data, a picture memory 2 having a storage capacity corresponding to the resolution and adapted for storage of pixel data, and a pixel cache memory 3 with a storage capacity of n×n pixels placed between the pixel data generator 1 and the picture memory 2 and as shown in FIG. 1.

The commands supplied from a computer, such as commands for drawing a line or a surface, data transfer command in the picture memory, such as so-called BITBLT (Bit Block Transfer) command, or a fill command of filling the inside of a figure, are decoded by picture data generator 1 to generate pixel data. These pixel data are stored in a picture memory 2 via high-speed pixel cache memory 3 and pixel data stored in the picture memory 2 are read out in timed relation to the scanning by a Braun tube, not shown, by a raster scanning, for displaying a picture. That is, high-speed drawing is enabled by arranging the pixel cache memory 3, which permits of high speed accessing, between the picture data generator 1 and the picture memory 2. For example, if moving, copying or filling of a small figure can be made within the pixel cache memory 3 by e.g. a transfer command or a fill command, reading of pixel data from pixel memory 2 may be eliminated to raise the drawing speed.

However, with the pixel cache system, if the pixel cache memory 3 is of a small storage capacity and addresses indicating the positions of the pixel data from pixel data generator 1 on the display screen exceeds boundary of the address region of the pixel data stored by the pixel cache memory 3, it becomes necessary to read and write pixel data between the pixel cache memory 3 and the picture memory 2 whenever the addresses traverse the boundary of the address region. Above all, the processing efficiency is significantly lowered when the picture memory 2 is random accessed to update pixel data.

The display apparatus constructed in accordance with the memory interleave system includes a picture data generator 5 for decoding commands and generating pixel data, an n number of memories $m_i$, where i=0~n−1, having a storage capacity equal to 1/n corresponding to the resolution of the display screen and adapted for storing the pixel data, and an n number of memory controllers $MP_i m$ where i=0~n−1, for controlling the n number of memories $m_i$.

The n number of memories $m_i$ make up a picture memory 6 corresponding to the display screen, with the memories $m_i$ dividing the picture memory 6 into e.g. 16 parts (N=16), as shown in FIG. 3. If the pixel at the upper left corner on the display screen is an origin, the horizontal and vertical directions are x and y axes, and the pixels on the display screen are indicated by $P_{x,\ y}$, where x, y are coordinates or pixel addresses on the display screen, the memories $m_0$, $m_1$, $m_2$, $m_3$, $m_4$, $m_5$ . . . $m_{15}$ store pixel data of the pixels $P_{4q,4r}$, $P_{4q+1,4r}$, $P_{4q+2,4r}$, $P_{4q+3,4r}$, pixels $P_{4q,4r+1}$, $P_{4q+1,4r+1}$, . . . $P_{4q+3,4r+3}$ (q, r=0, 1, 2, . . . ).

For example, commands for drawing line segments or pictures from CPU, data transfer commands or fill commands are decoded by picture data generator 5 to generate pixel data which are stored in the memories $m_i$ based on addresses supplied commonly from pixel data generator 5 under control by memory controller $MP_i$. The stored pixel data in the memories $M_i$ are read out by raster scanning for displaying the picture on the Braun tube, not shown. That is, 16 memory controllers $MP_0$~$MP_{15}$ access one of blocks $B_{x,\ y}$ constituted by 4×4 pixels $P_{4q,4r}$~$P_{4q+3,4r+3}$ based on block addresses (X, Y) (X, Y=0, 1, 2, . . . ) supplied from picture data generator 5, for simultaneously accessing the 16 pixels in the block $B_{x,\ y}$ to realize a high processing rate, as shown in FIG. 17.

However, this memory interleave system has a drawback that, if the pixel addresses (x, y) indicating the positions on the display screen exceed the boundary of the block $B_{x,\ y}$, the processing efficiency is lowered significantly. Besides, when accessing is had continuously to the pixels $P_{x,\ y}$ supervised by the same memory controller $MP_i$, the processing efficiency is similarly lowered significantly.

Taking an example of a data transfer command,such as BITBLT command, if pixel data of an arbitrary block $B_{x,\ y}$ of picture memory 6, for example block $B_{0,2}$, is to be transferred to block $B_{2,1}$, as shown by the uppermost double-line arrow, the pixel data read out based on the block address (0, 2) from pixel data generator 5 are written by the block address (2, 1 ) under control by each memory controller $MP_i$, as shown in FIG. 17. In this manner, data transfer may be achieved within the memory $m_i$ control led by the memory controller $MP_i$ itself to realize high-speed data transfer. However, if the area of the originate or the area of the receiver are not coincident with the boundary of the block $B_{x,\ y}$, that is, if pixel data of block $B_{0,\ 2}$ are to be transferred, as shown by the lowermost double-line arrow, to an area 7 composed of 4×4 pixels $P_{x,\ y}$, as shown in FIG. 3, each memory controller $MP_i$ is unable to transfer data within the memory $m_i$ controlled by memory controller $MP_i$, so that data transfer cannot be achieved without communication between the memory controllers $MP_i$ .

Consequently, if data transfer is to be effected in the above-described manner, it is necessary to effect communication, such as data transfer, between memory controllers $MP_i$, and subsequently to write pixel data four times into blocks $B_{1,2}$, $B_{2,2}$, $B_{1,3}$ and $B_{2,3}$ present in the area 7, thus lowering the processing efficiency.

With the above-described memory interleave system, which consists in dividing the picture memory 82 having the storage capacity conforming to the resolution of the display screen into an n number of sections and controlling the memories $m_i$ by dedicated memory controllers $MP_i$ for simultaneously accessing 16 pixels $P_{x,\ y}$ in the same block $B_{x,\ y}$ to achieve high processing speed, the memory controller $MP_i$ has no address generating function, as a result of which the processing efficiency tends to be lowered significantly.

OBJECTS AND SUMMARY OF THE INVENTION

In view of the above-described status of the art, it is an object of the present invention to provide a picture memory apparatus operated in accordance with the memory interleave system, in which pixel data of an area of an arbitrary size on the display screen can be transferred at an elevated speed to an optional position.

It is another object of the present invention to provide a graphic engine apparatus having a high drawing speed.

In accordance with the present invention, there is provided a picture memory apparatus comprising an n number of memory means (M) each having a storage capacity equal to 1/n of a storage capacity corresponding to the resolution of a display screen and each being adapted for storing a pixel data, an n number of control means (XP) each having first and second input/output ports for inputting and outputting the pixel data and each adapted for controlling readout and writing of pixel data in and from the memory means via first input/output port, and bus connection means for commonly interconnecting the second input/output ports of the n number of said controlling means. The n number of controlling means perform a control operation of finding the number of controlling means of a receiver of the pixel data in synchronism, while performing a control operation of supplying pixel data read out from the memory means via first input/output port to controlling means of a receiver via input/output port and bus connection means and of causing control means of the receiver to write pixel data supplied thereto via bus connection means and the second input/output port in said memory means via first input/output port.

In accordance with the present invention, there is also provided a picture memory apparatus comprising an n number of memory means (M) each having a storage capacity equal to 1/n of a storage capacity corresponding to the resolution of a display screen and each being adapted for storing a pixel data, an n number of control means (XP) each having first and second input/output ports for inputting and outputting the pixel data and each adapted for controlling readout and writing of pixel data in and from the memory means via the first input/output port, and bus connection means for commonly interconnecting the second input/output ports of the n number of the controlling means. The n number of controlling means perform a controlling operation of supplying pixel data read out from the memory means via first input/output port and bus connection means to controlling means of a receiver via the second input/output port and the bus connection means, while also performing a controlling operation of finding the number of the controlling means of an originate in synchronism and of causing control means of a receiver to write pixel data supplied thereto from controlling means of an originate via the bus connection means and the second input/output port in the memory means via the first input/output port.

In accordance with the present invention, there is also provided a graphic engine apparatus comprising a memory for storage of commands for picture processing, a setup processor (SP) for sequentially reading out the commands stored in the memory for calculating parameters necessary for generating pixel data, a rendering processor (RP) for supervising data flow for graphic processing, a pixel data generating circuit (LP) for generating pixel data responsive to parameters and commands for generating pixel data from the setup processor, a pixel memory unit for storing pixel data from the pixel data generating circuit, and a video processing unit for converting pixel data read out from the pixel data generating circuit. The picture memory unit includes an n number of memory means (M) each having a storage capacity equal to 1/n of a storage capacity corresponding to the resolution of a display screen and each being adapted for storing a pixel data, an n number of control means (XP) each having first and second input/output ports for inputting and outputting the pixel data and each adapted for controlling readout and writing of pixel data in and from the memory means via first input/output port, and bus connection means for commonly interconnecting the second input/output ports of the n number of said controlling means. The n number of controlling means perform a control operation of finding the number of controlling means of a receiver of pixel data in synchronism, while also performing a control operation of supplying pixel data read out from the memory means via the first input/output port to controlling means of a receiver via second input/output port and bus connection means and of causing control means of the receiver to write pixel data supplied thereto via bus connection means and second input/output port in said memory means via first input/output port.

In accordance with the present invention, there is additionally provided a graphic engine apparatus comprising a memory for storage of commands for picture processing, a setup processor (SP) for sequentially reading out the commands stored in the memory for calculating parameters necessary for generating pixel data, a rendering processor (RP) for supervising data flow for graphic processing, a pixel data generating circuit (LP) for generating pixel data responsive to parameters and commands for generating pixel data from the setup processor, a pixel memory unit for storing pixel data from the pixel data generating circuit, and a video processing unit for converting pixel data read out from the pixel data generating circuit. The pixel memory unit comprises an n number of memory means (M) each having a storage capacity equal to 1/n of a storage capacity corresponding to the resolution of a display screen and each being adapted for storing a pixel data, an n number of control means (XP) each having first and second input/output ports for inputting and outputting the pixel data and each adapted for controlling readout and writing of pixel data in and from the memory means via said first input/output port, and bus connection means for commonly interconnecting the second input/output ports of the n number of the controlling means. The n number of controlling means perform a controlling operation of supplying pixel data read out from the memory means via first input/output port and bus connection means to controlling means of a receiver via second input/output port and the bus connection means, while also performing a controlling operation of finding the number of the controlling means of an originate in synchronism and of causing control means of the receiver to write pixel data supplied thereto from controlling means of an originate via the bus connection means and the second input/output port in the memory means via the first input/output port.

DESCRIPTION OF THE PREFERRED EMBODIMENTS

Figure 4:
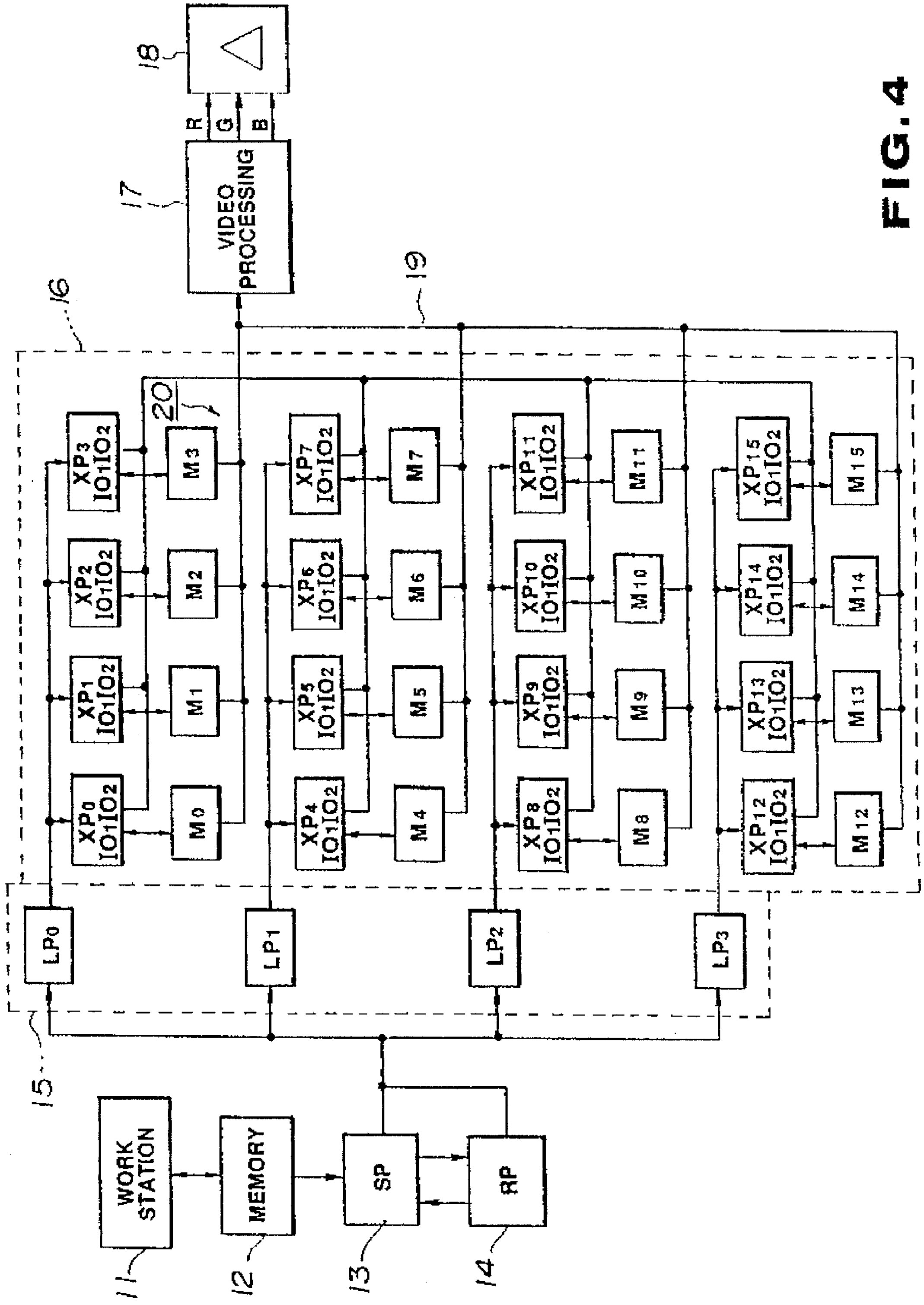
FIG. 4 shows a circuit of a graphic engine apparatus to which a picture memory apparatus according to the present invention is applied.

Referring to the drawings, preferred embodiments of the picture memory apparatus according to the present invention will be explained in detail. FIG. 4 shows a circuit construction of a graphic engine apparatus to which the picture memory apparatus according to the present invention is applied.

First, the graphic engine apparatus is explained.

The graphic engine apparatus is made up of a main body of a workstation 11, a memory 12 connected to an inner bus of the main body of the workstation 11, a setup processor (SP) 13 for sequentially reading out commands from memory 12 for calculating parameters required for generating pixel data, a rendering processor (RP) 14 for supervising data flow of the graphic engine, a picture data generating circuit 15 for generating pixel data responsive to pixel data generating commands and parameters, a picture memory unit 16 for storing the pixel data from picture data generating circuit 15, a video processing circuit 17 for converting pixel data read out from picture memory unit 16 into RGB signals, and a Braun tube 18 for displaying the picture based on the RGB signals from the video processing circuit 17, as shown in FIG. 4.

With the present graphic engine apparatus, the main body of the workstation 11 and the memory 12 are interconnected by a Versa Module European (VME) bus, so that memory 12 temporarily stores commands concerning picture processing from the main body of the workstation 11, such as commands for drawing line segments or a plane, data transfer commands, fill commands, etc. The stored commands are sequentially read out by SP 13 and converted into commands for generating pixel data (referred to hereinafter simply as commands) and parameters. These commands and parameters are transmitted to picture data generating circuit 15. The picture data generating circuit 15 decodes the commands to generate pixel data conforming to parameters, such as pattern information, color information, mask information, coordinate information on the display screen of the Braun tube 18, and commands, such as data transfer commands, these data being transmitted to picture memory unit 16. The picture memory unit 16 is a so-called bit map type memory and has a storage capacity corresponding to the resolution of a display screen of the Braun tube, such as 1024×1024 pixels. The picture memory unit 16 stores the pixel data of the respective pixels which are read out in timed relation to scanning of the Braun tube 18 (raster scanning) and transmitted to the video processing circuit 17. The video processing circuit 17 is constituted by e.g. a D/A converter and is adapted for converting the pixel data into RGB signals for displaying the picture based on the RGB signals on the Braun tube 18.

The graphic engine apparatus is also adapted for executing data transfer commands, such as bit block transfer (BITBLT) commands, by pixel data transfer within the picture memory unit 16.

Specifically, the picture memory unit 16 has an n number of memories $M_i$ for storing pixel data and having a storage capacity of 1/n of a storage capacity corresponding to the resolution of the Braun tube 18, an n number of pixel processors $XP_i$ (i=1~n−1) each having first and second input/output ports $IO_1$, $IO_2$ for inputting and outputting pixel data and adapted for controlling reading and recording of the pixel data in and from memory $M_i$ via first input port $IO_1$, and a bus (transfer bus) 19 for commonly connecting the second input/output ports $IO_2$ of the n number of pixel processors $XP_i$ for effecting transfer of the pixel data between the pixel processors $XP_i$, as shown in FIG. 4.

Figure 1:
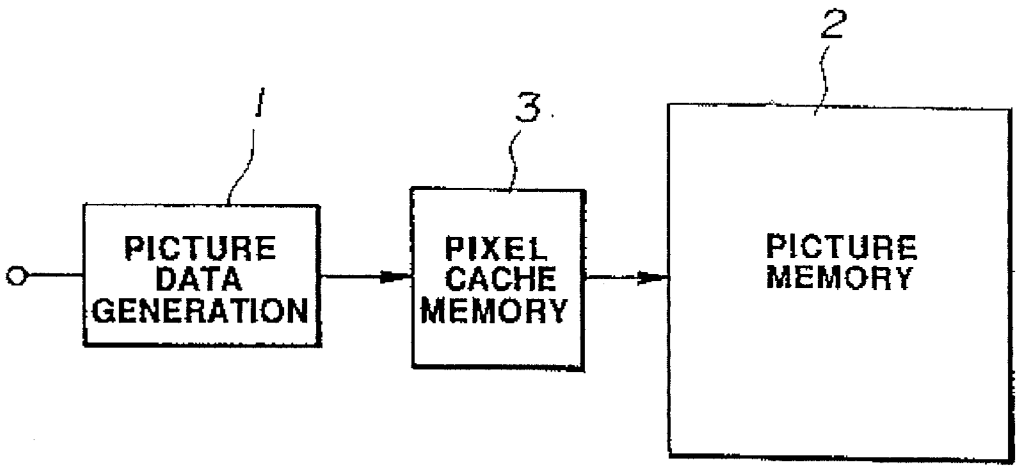
FIG.1 (PRIOR ART)
FIG. 1 shows a circuit of a conventional display apparatus operated in accordance with a pixel cache system.
Figure 2:
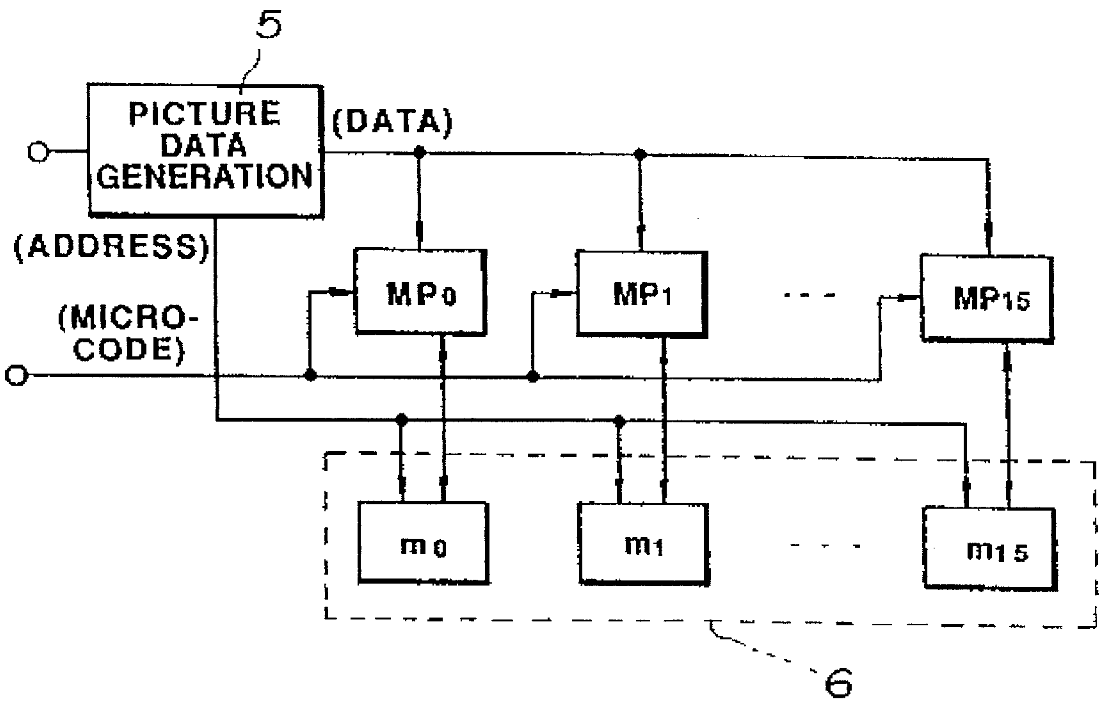
FIG.2 (PRIOR ART)
FIG. 2 shows a circuit of a conventional display apparatus operated in accordance with a memory interleave system.
Figure 3:
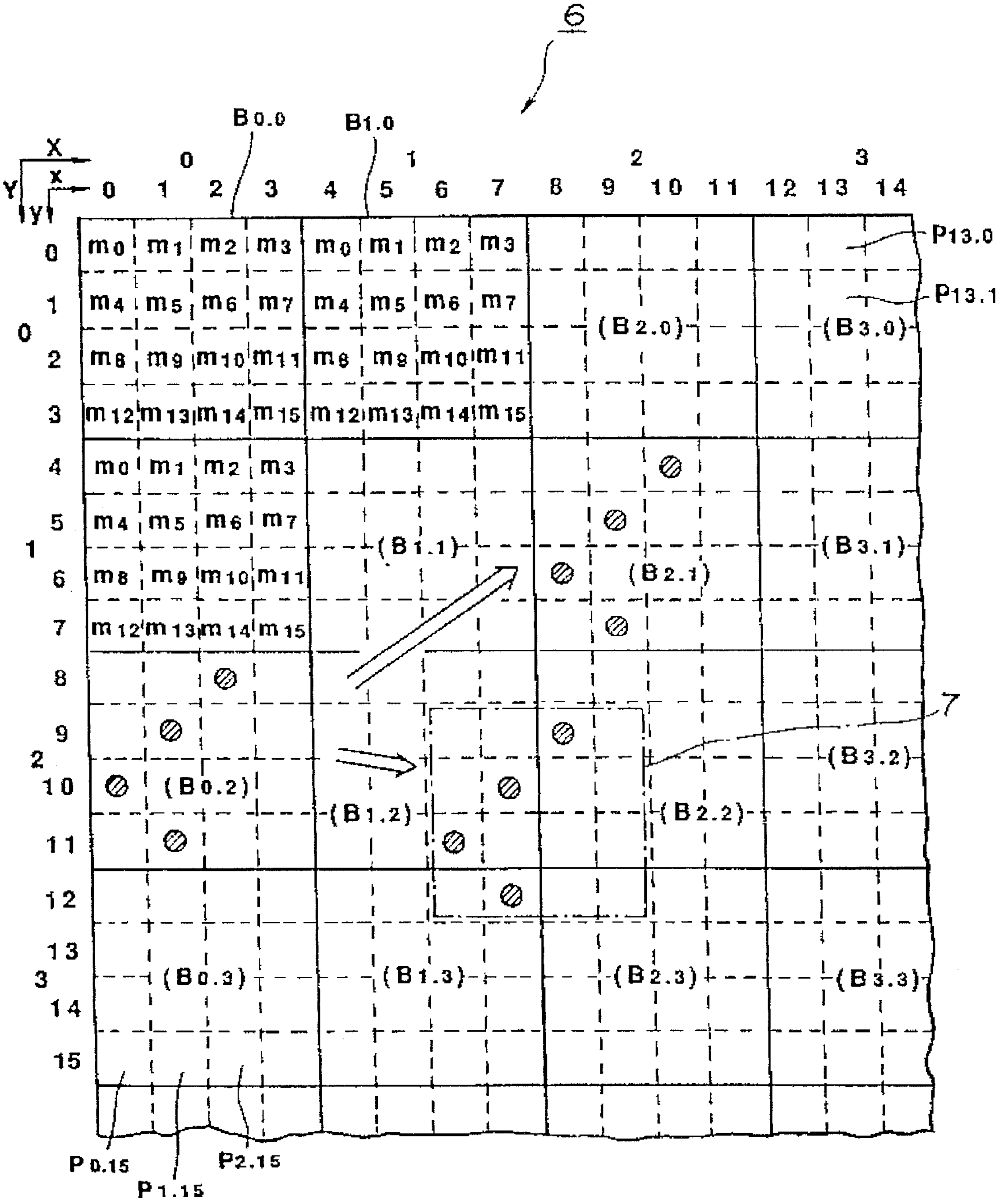
FIG. 3 (PRIOR ART)
FIG. 3 shows the relative positions of the pixels on a display screen constituting the conventional display apparatus operated in accordance with the memory interleave system.

That is, the pixel memory unit 16 is constructed in accordance with the memory interleave system, and the memory 20 associated with the display screen of the bit map system is constituted by an n number of memories $M_i$. Each memory $M_i$ is so constructed that, as described in connection with the prior art shown in FIG. 3, if the picture memory 20 is divided into 16 parts (N=16), the pixels at the left upper corner of the display screen of the Braun tube 18 is an origin, the horizontal and vertical directions are denoted as x and y axes, and the pixels on the display screen are denoted by $P_{x,y}$, x and y being coordinates on the display screen, referred to hereinafter as pixel addresses, the memories $M_2$, $M_3$, $M_4$, $M_5$, . . . $M_{15}$ store the pixel data for pixels $P_{4q,4r}$, $P_{4q+2,4r}$, $P_{4q+3,4r}$, . . . $P_{4q,4r+1}$, $P_{4q+1,4r+1}$, . . . $P_{4q+3,4r+3}$ (q, r=0, 1, 2, . . . ). Each memory $M_i$ is of plural plane structure in case of a color display and is adapted for storing three color data, namely red color data, green color data, blue color data and depth data for three-dimensional display for each pixel $P_{x,y}$. One of the planes is used as a fill work buffer for executing filling.

On the other hand, the pixel processors $XP_i$ are provided for memories $M_i$ in a one-for-one relationship, such that, if the picture memory 20 is divided into 16 paths, the number of the pixel processors is also 16, as shown in FIG. 4. These pixel processors $XP_0$~$XP_{15}$ supply pixel data from picture data generator 15 via input/output port $IO_1$ to memories $M_0$~$M_{15}$, while generating associated addresses for controlling the recording in the associated memories $M_i$.

The pixel processors $XP_i$ are adapted for being operated in synchronism with one another, such that, when data are transferred within the picture memory 20, the numbers j of the pixel processors $XP_i$ of the pixel data receiver are found in synchronism, the pixel data read out via input/output ports $IO_1$ from memory $M_i$ based on the number j are outputted at TBus 19 via input/output ports $IO_2$ in the increasing order of the number j of the receiver, the pixel data supplied from the pixel processor $XP_i$ of the originate via TBus 19 and input/output ports $IO_2$ are received by the processor $XP_i$ in the sequence of the increasing numbers i, and the received pixel data are simultaneously written in the memories $M_i$ via input/output ports $IO_1$.

On the other hand, if the picture memory 20 is divided into 16 parts, the picture data generating circuit 15 is made up of four picture data generators $LP_0$~$LP_3$, and is adapted for decoding commands from SP 13 and generating pixel data responsive to parameters, as shown for example in FIG. 4. Thus the pixel data generator $LP_0$ supply the generated pixel data to the pixel processors $XP_0$~$XP_3$, the pixel data generator $LP_1$ supply the generated pixel data to the pixel processors $XP_4$~$XP_7$, the pixel data generator $LP_2$ supply the generated pixel data to the pixel processors $XP_8$~$XP_{11}$, and the pixel data generator $LP_3$ supply the generated pixel data to the pixel processors $XP_{12}$~$XP_{15}$.

Figure 5:
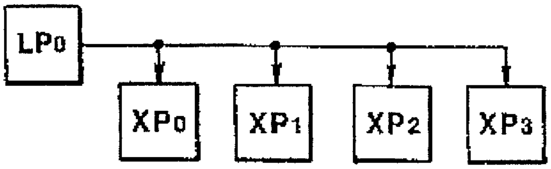
FIG. 5 shows a modified construction of the picture memory apparatus and the picture data generating apparatus making up the graphic engine apparatus shown in FIG. 4.
Figure 6:
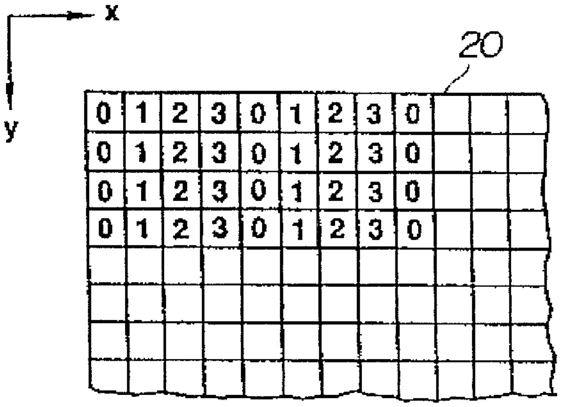
FIG. 6 shows relative positions of the pixels on the display screen controlled by each pixel processor constituting the picture memory apparatus shown in FIG. 5.

It is noted that the picture memory unit 16 and the picture data generator 15 are not limited to the construction of dividing the picture memory 20 into 16 parts, as shown in FIG. 4. For example, if the picture memory 20 is divided into four parts, a basic unit consisting of a picture data generator LP and four pixel processors $XP_i$ as shown for example in FIG. 5 is used, and each of the pixel processors $XP_0$~$XP_3$ is adapted to control reading and writing of the associated pixel data of the corresponding pixels on the display screen of the picture memories, indicated by numbers 0 to 3, as shown in FIG. 6.

Figure 7:
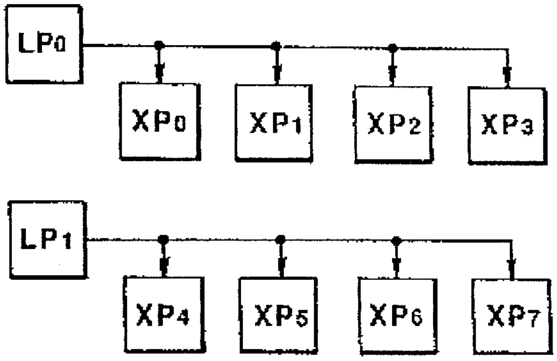
FIG. 7 shows another modified construction of the picture memory apparatus and the picture data generating apparatus making up the graphic engine apparatus shown in FIG. 4.
Figure 8:
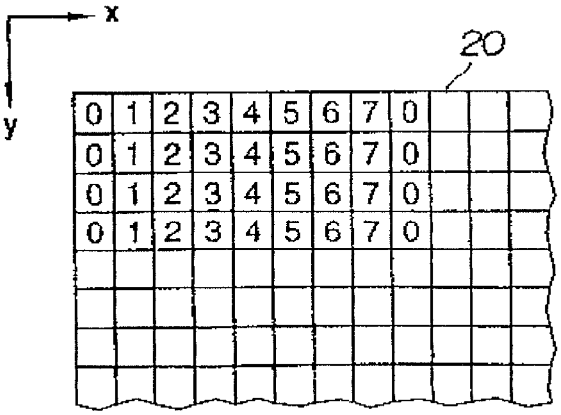
FIG. 8 shows relative positions of the pixels on the display screen control led by each pixel processor constituting the picture memory apparatus shown in FIG. 7.

For example, if the picture memory 20 is divided into eight parts, two of the above-mentioned basic units as shown for example in FIG. 7 are used, and each of the pixel processors $XP_0$~$XP_7$ is adapted to control reading and writing of the associated pixel data of the corresponding pixels on the display screen of the picture memories, indicated by numbers 0 to 7, as shown in FIG. 8.

Figure 9:
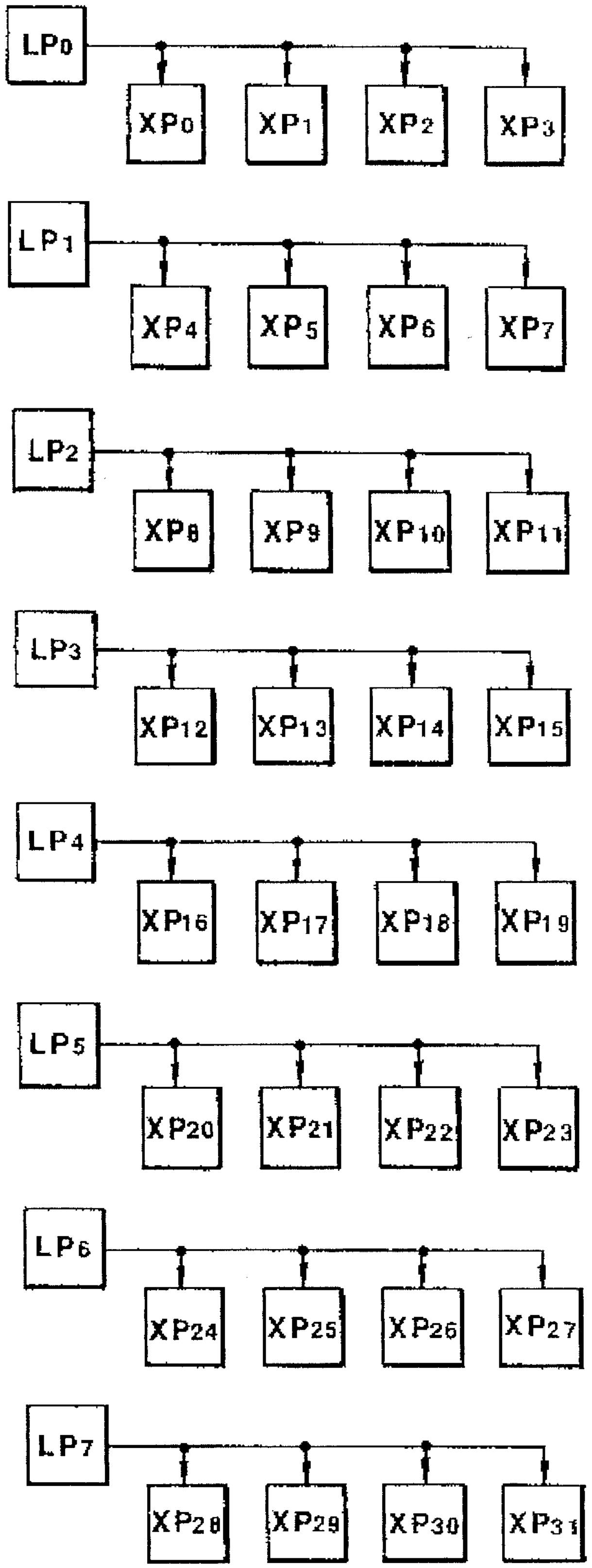
FIG. 9 shows a further modified construction of the picture memory apparatus and the picture data generating apparatus making up the graphic engine apparatus shown in FIG. 4.

If the picture memory 20 is divided into 32 parts, eight of the above-mentioned basic units as shown for example in FIG. 9 are used, and each of the pixel processors $XP_0$~$XP_{31}$ is adapted to control reading and writing of the associated pixel data of the corresponding pixels on the display screen of the picture memories, indicated by numbers 0 to 31, as shown in FIG. 9. In sum, it suffices if the picture memory unit 16 is constructed in accordance with the memory interleave system in which the picture memory 20 is divided into plural parts in connection with the resolution of the display screen and each of the pixel processors $XP_i$ controls each memory $M_i$ resulting from division. A concrete arrangement is hereinafter explained, in which the picture memory 20 is divided into 16 parts.

Figure 11:
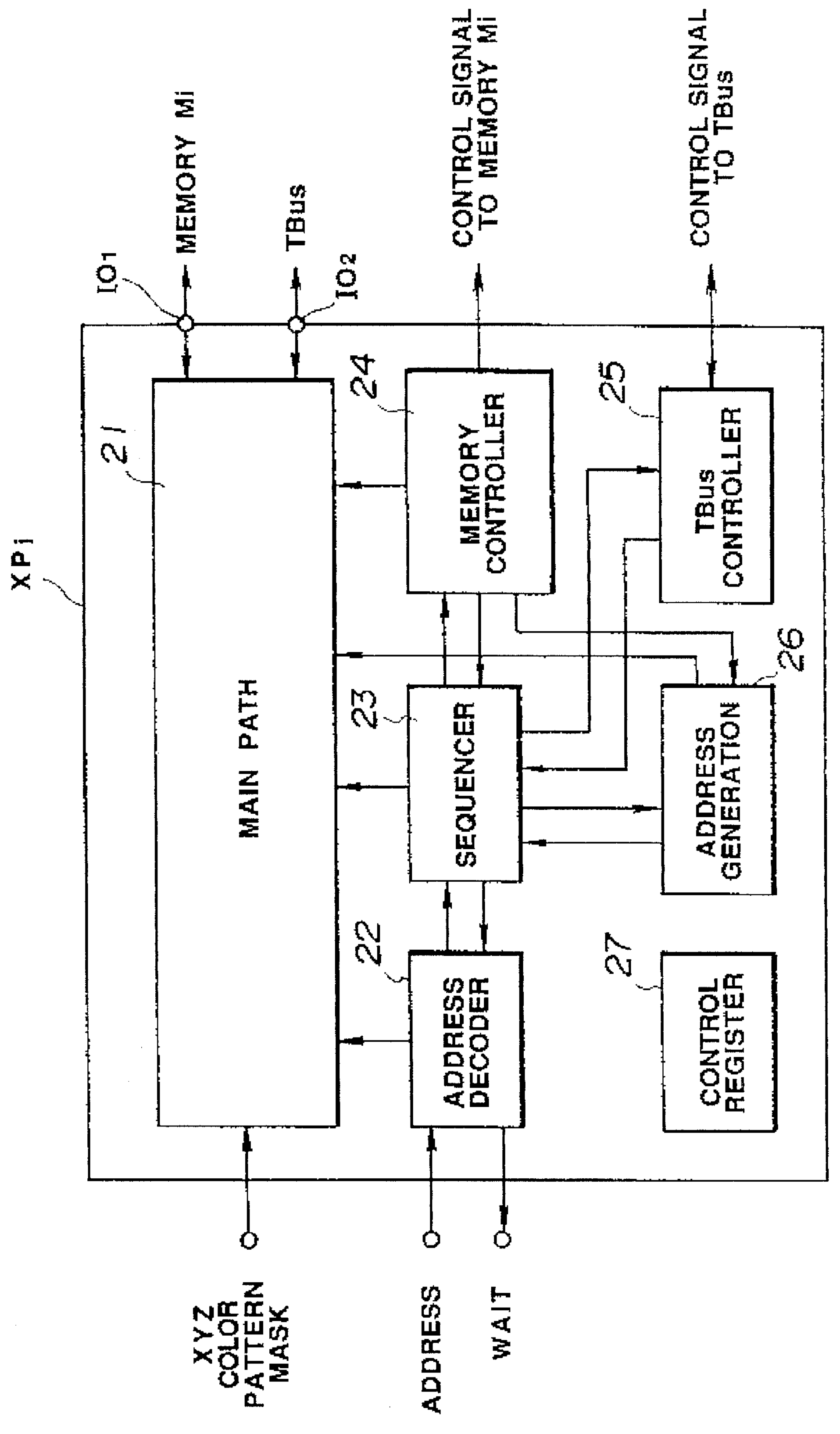
FIG. 11 shows a concrete circuit arrangement of a pixel processor $XP_i$ constituting the picture memory unit.

The pixel processor $XP_i$ is made up of a main path circuit 21 for supplying pixel data supplied from the pixel data generators $LP_0$~$LP_3$ via input/output port $IO_1$ to memory $M_i$ and for outputting the pixel data read out from memory $M_i$ via input/output port $IO_1$ to TBus 19 via input/output port $IO_2$, an address decoder 22 for decoding addresses supplied from picture data generators $LP_0$ to $LP_3$ for controlling the so-called pipeline operation of the main path circuit 21, a sequencer 23 for controlling data flow through main path circuit, a memory controller 24 for controlling reading and recording of the pixel data in and from memory $M_i$, a TBus controller 25 for finding the number j of the pixel processor $XP_i$ of the receiver for deciding whether or not there is the transfer and for controlling the TBus 19, an address generator 26 for generating the addresses of a rectangular transfer area at the time of data transfer of e.g. BITBLT command for supplying the addresses to the sequencer 23, and a control register 27 for storing parameters for controlling the components from the main path circuit 21 to address generator 26, as shown for example in FIG. 11.

Figure 12:
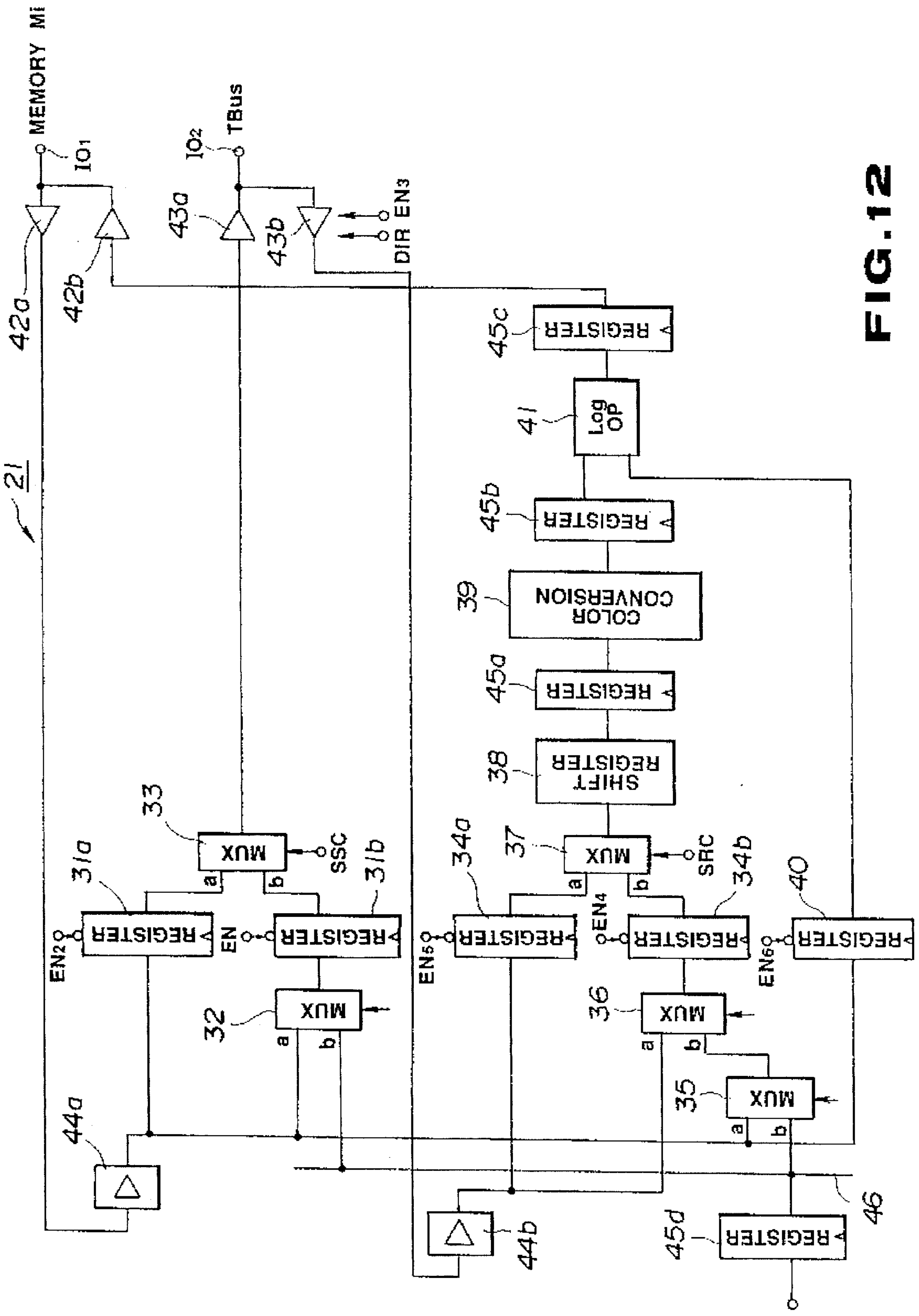
FIG. 12 shows a circuit arrangement of a main path circuit 21 consisting the pixel processor $XP_i$.

The main path circuit 21 is essentially made up of transfer registers 31*a*, 31*b* for transiently storing pixel data read out via input/output port $IO_1$ from memory $M_i$ for outputting stored pixel data at TBus 19 via input/output port $IO_2$, a multiplexor 32 for changing over and selecting pixel data supplied read out from memory $M_i$ via input/output port $IO_1$ or pixel data supplied via inner data bus 46 provided in the main path circuit 21 and outputting the selected pixel data via input/output port $IO_2$ to TBus 19, reception registers 34*a*, 34*b* for transiently storing pixel data supplied from TBus 19 via input/output port $IO_2$ and supplying stored pixel data via input/output port $IO_1$ to memory $M_i$, a multiplexor MUX 35 for changing over and selecting the pixel data supplied TBus 19 via input/output port $IO_2$ or the pixel data supplied via inner data bus 46, a multiplexor MUX 36 for changing over and selecting the pixel data read out from memory $M_i$ via input/output port $IO_1$ and the pixel data selected by multiplexor MUX 35, a multiplexor MUX 37 for changing over and selecting one of the pixel data from registers 34*a*, 34*b*, a shift register 38 for shifting data of a predetermined plane of the pixel data deselected by MUX 37 for detecting control data of changing over the background color display or the foreground color display, a color converter 39 for generating color-converted pixel data based on control data from shift register 38, a register 40 for transiently storing destination data read from memory $M_i$ via input/output port $IO_1$, a logical operation circuit 41 for recording pixel data obtained after logical operation of the pixel data from color-converter 39 and pixel data from register 40 in memory $M_i$ via input/output port $IO_1$, buffers 42*a*, 42*b* for changing over the directions of the input/output port $IO_1$ and buffers 43*a*, 43*b* for changing over the directions of the input/output port $IO_2$, as shown for example in FIG. 12.

Meanwhile, buffers 44*a*, 44*b* are designed for increasing the number of fan-outs, while registers 45*a*, 45*b*, 45*c* and 45*d* are designed for performing a pipeline processing operation. For data transfer commands, multiplexors MUX 32, 35 select pixel data from buffer 44*a*, multiplexor MUX 36 is fixed for selecting pixel data from buffer 44*b*, multiplexor MUX 33 is controlled by control signal SSC from sequencer 23, and multiplexor 37 is controlled by control signal SRC from sequencer 23. Registers 31*a*, 31*b*, 34*a*, 34*b* are controlled by enabling signals permitting of writing from sequencer 23.

The above-described main path circuit 21 is controlled by sequencer 23 and memory control let 24, so that data transfer between memories $M_i$ is carried out over TBus 19. Data transfer operation in case of non-coincidence of the area of the originate, referred to hereinafter as source area, and the area of the receiver, referred to hereinafter as destination area, as viewed on the display screen, with the boundary of the block $B_{x,\,y}$ shown in FIG. 3 and discussed in connection with the prior art, is hereinafter explained.

Figure 13:
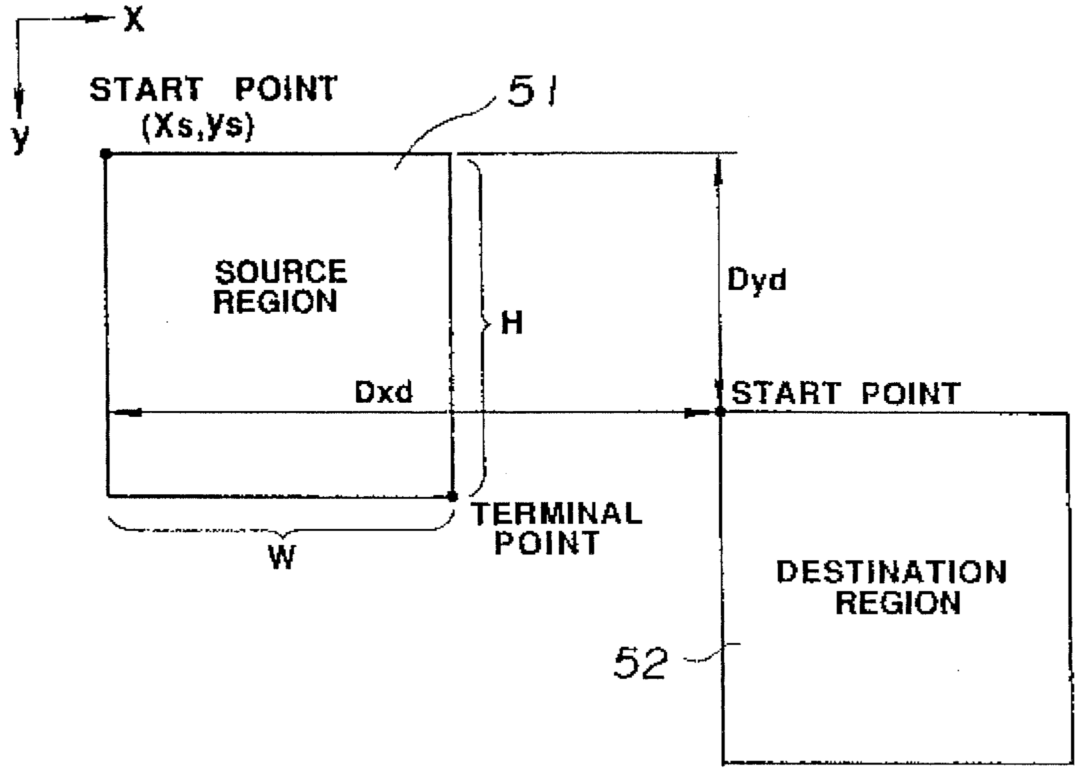
FIG. 13 is a diagrammatic view showing a source area and a destination area on a display screen.

Each pixel processor $XP_i$ is adapted for executing copy transfer of the rectangular area by the above-described PIXBLT command. With such command, the coordinate values $(x_s, y_s)$ of a starting point which is a pixel at the left upper corner of the source area, the size W, H of the source area 51, and distances $D_{Xd}$, $D_{Yd}$ up to the destination area 52, stored in memory 12, as shown in FIG. 13, are supplied via SP 13 and picture data generators $LP_0$~$LP_3$.

The pixel processor $XP_i$ finds the number j of the pixel processor $XP_j$ of the destination by the formula (I):

$$j=((Dy_d<<2)+i)\wedge In)\vee((Dx_d+i)3H \qquad (1)$$

In the above formula (I), symbols <<2, $\wedge$ and $\vee$ indicate shift left by 2 bits, logical product and logical sum, respectively. It is noted that $D_{Yd}$, $D_{Xd}$, In and 3H are expressed by a hexadecimal notation, while the value of In is 0H (0), 4H (4), CH (12), 1CH (28), where the bracketed number is a decimal number, in association with 4, 8, 16 and 32 of the numbers n of the pixel processors $XP_i$, which number is the number of division of the picture memory 20.

Figure 14:
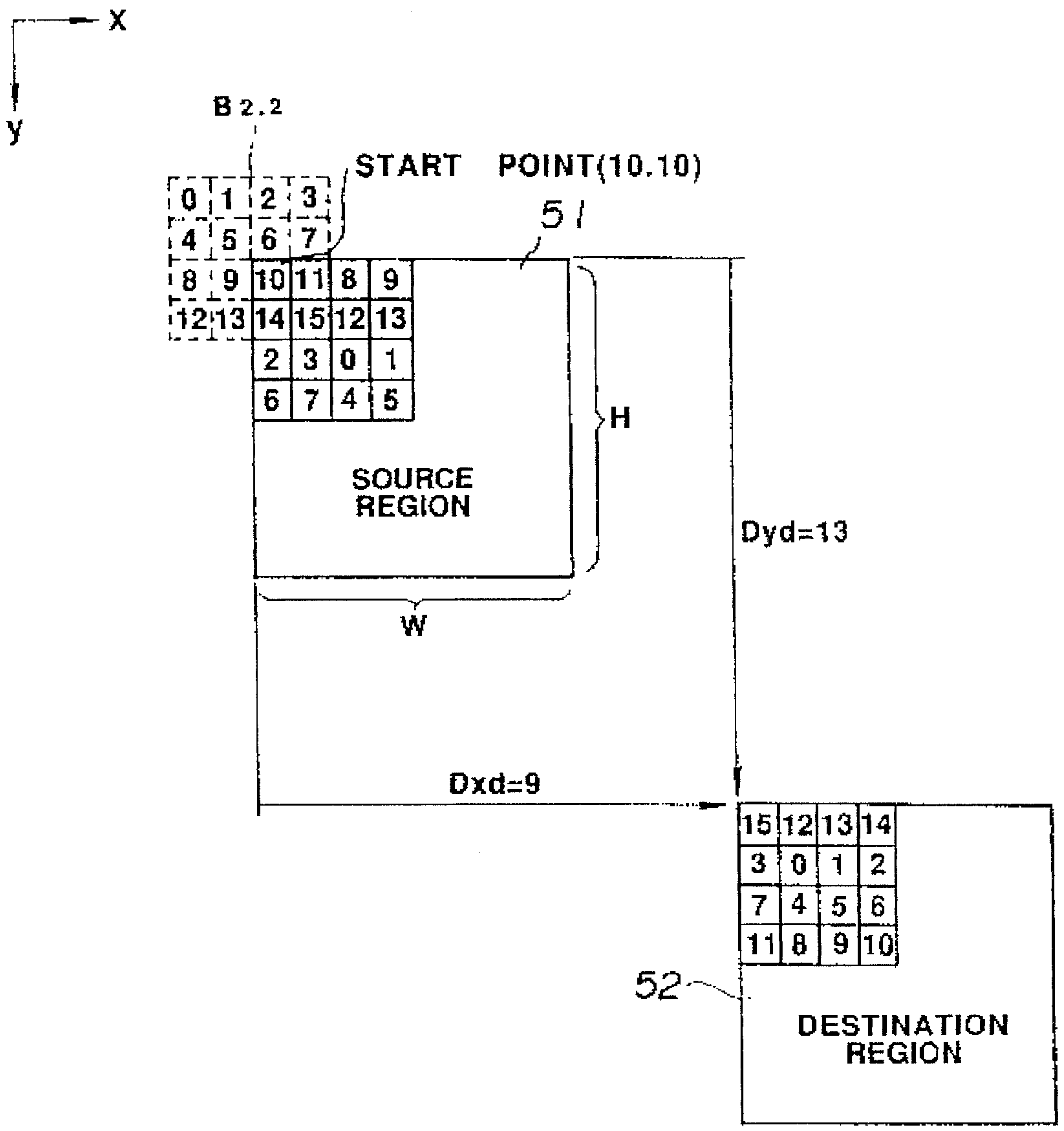
FIG. 14 is a diagrammatic view showing the source area and the destination area for illustrating a formula for finding the number j of the pixel processor $XP_j$ of the destination.

Specifically, if, with the coordinate values $(x_s, y_s)$ of a starting point of the source area 51 of (10, 10), the size of the source area W, H of 8, and the distances $D_{Xd}$, $D_{Yd}$ up to the destination area 52 of 9, 13, the boundary of the source area 51 is not coincident with the boundary of the block $B_{x,\,y}$, as shown for example in FIG. 14, each TBus controller 25 finds the number j of the pixel processor $XP_j$ of the destination area from formula I as 5H (5)~FH (15), 0H (0)~4H (4), to control the TBus 19 based on this number j. On the other hand, each address decoder 21 checks as to which is the number of times required of the transfer operations on the basis of the size W, H of the source area 51 to advice the sequencer 23 of the start of transfer, while advising it of the end of transfer when the required number of the transfer operations have come to an end.

Figure 15:
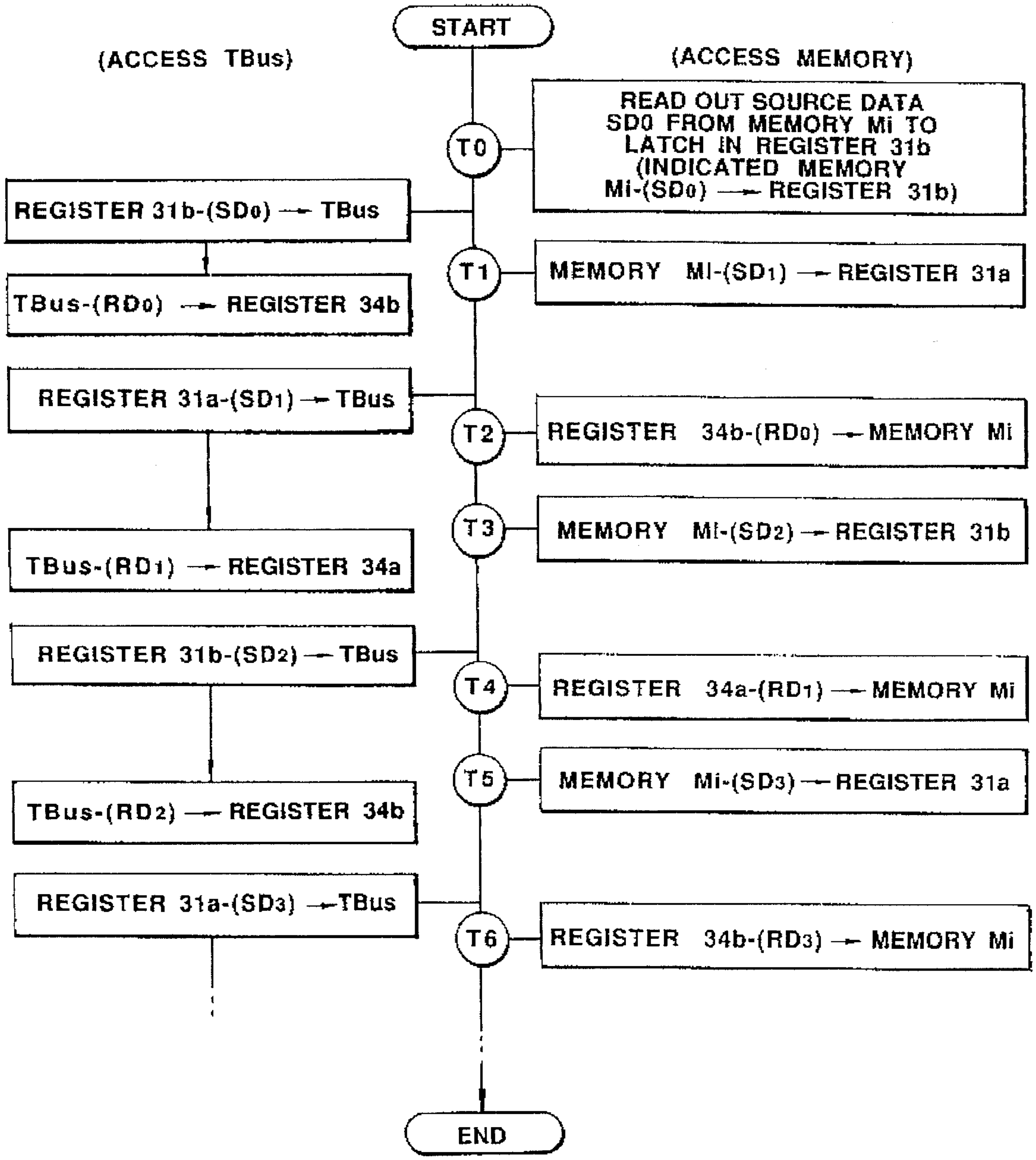
FIG. 15 is a flow chart for illustrating the operation of a BITBLT command not accompanied by logical operation.

On reception of the notice of start of transfer from address decoder 21, sequencer 23 starts the control of the main path circuit 21. In the BITBLT command which is not accompanied by a logical operation in which a predetermined processing is carried out on the pixel data transferred and the pixel data of the destination area 52 and the produced pixel data is adopted as pixel data of new destination area 52, sequencer 23 controls the flow of data in the main path circuit 21 in operative association with memory controller 24 and TBus controller 25 in accordance with the flow chart shown in FIG. 15. Meanwhile, the left-hand side and the right-hand side of the flow chart show accessing operations to the TBus 19 and to memory $N_i$, respectively. The pixel data read from memory $M_i$ of the originate are source data $SD_k$, where k=0, 1, 2, . . . , while pixel data received by the pixel processor $XP_j$ of the destination is the reception data or received data.

The source data $SD_0$ read out from memory $M_i$ at timing $T_0$ are latched by register 31*b* via input/output port $IO_1$, buffers 42*a*, 44*a* and multiplexor MUX 32. The latched source data $SD_0$ are outputted via multiplexor MUX 33, buffer 43*a* and input/output port $IO_2$ at TBus 19. The outputting sequence of the pixel processors $XP_i$ is in the sequence of the increasing numbers j indicating the number of the pixel processor $XP_j$ of the destination as found based on the above formula (I).

At timing T1, the source data $SD_1$ as read out from memory $M_i$ in readiness for data transfer for the next pixel is latched at register 31*a*. The reception data transferred over TBus 19 from other pixel processors $XP_i$ at the above-mentioned timing T0 is latched at register 34*b* via input/output port $IO_0$, buffers 43*a*, 44*b* and multiplexor MUX 36. After the end of data transfer between thee pixel processors $XP_i$, the next source data latched by the register 31*a* is outputted over TBus 19.

At timing T2, the reception data $RD_0$ latched at register 34*b* at timing T1 is color-converted, if need be, and reception data $RD_0$, for example, are directly set as write data $WD_0$ which is supplied to memory $M_i$ via logical operation circuit 41, register 45*c*, buffer 42*b* and input/output port $IO_1$. That is, with the BITBLT command not accompanied by logical operation, the logical operation circuit 41 directly transmits the reception data $RD_0$ to memory $M_i$.

At timing T3, source data $SD_2$ is latched in register 31*b*, in readiness for next pixel data transfer, as in the above-mentioned operation at timing T1. Reception data $RD_1$ transmitted from other pixel processors $XP_i$ is latched at this time at register 34*a*. After the end of data transfer between the pixel processors $XP_i$, the source data latched in register 31*b* is outputted at TBus 19.

At timing T4, reception data $RD_1$ from other pixel processors $XP_i$, latched at timing T3 in register 34*a*, is color-converted, if need be, and reception data $RD_1$, for example, is directly set as write data $WD_1$ which is supplied to memory $M_i$.

The above-described operations of reading out source data $SD_{k+1}$ from memory $M_i$ and outputting source data previously read out to TBus 19 simultaneously and alternately via registers 31*a*, 31*b* and of receiving reception data $RD_{k+1}$ transmitted over TBus 19 and writing the previously received reception data as write data $WD_k$ in memory $M_i$ simultaneously and alternately by registers 34*a*, 34*b*, are repeatedly performed until data transfer to the totality of the pixels within the source area 51 comes to an end. The result is that data transfer between the pixel processors $XP_i$ may be completed substantially within the memory accessing time. In other words, accessing (reading and writing) of memory $M_i$ and accessing (data transmission and reception) of TBus 19 may be performed simultaneously to enable high speed data transfer between the pixel processors $XP_i$.

Figure 16:
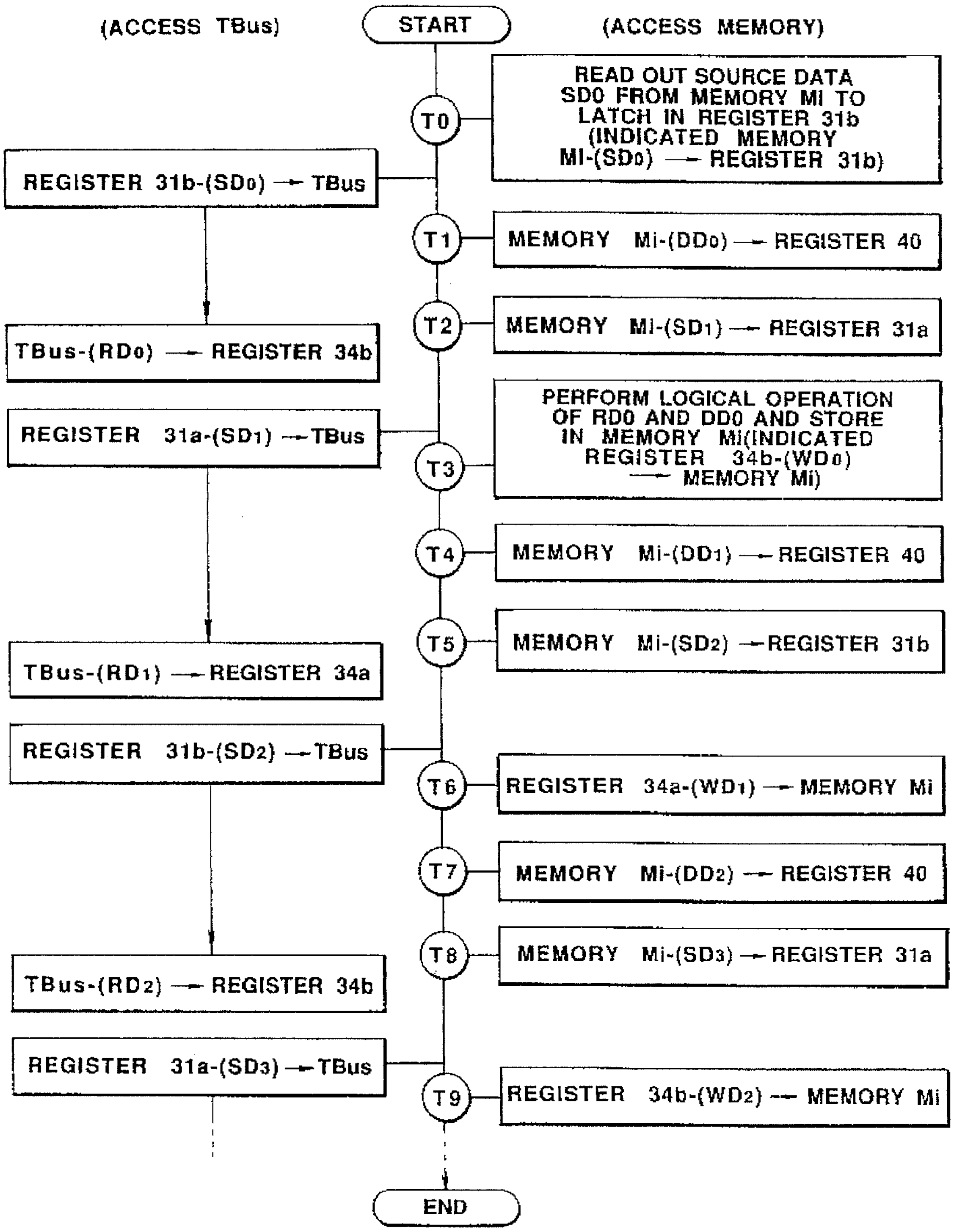
FIG. 16 is a flow chart for illustrating the operation of a BITBLT command accompanied by logical operation.

Meanwhile, with the BITBLT command, accompanied by the logical operation, writing in register 40 of destination data $DD_k$, which is the pixel data of the destination from memory $N_i$ at timings T1, T4 or T7, is annexed, while a logical operation between destination data $DD_k$ prior to writing of write data $WD_k$ at timings T3, T6 and T9 in memory $M_i$ and optionally color-converted reception data $RD_k$, for example, a logical operation between destination data $DD_k$ and pixel data resulting from color conversion of the reception data $RD_k$, is also annexed, as shown in FIG. 16. However, these operations may also be completed within the memory access time, so that, similarly to the case in which the BITBLT command is not accompanied by the above-mentioned logical operation, data transfer may be executed at a higher speed.

The accessing timing to the memory $M_i$ and TBus 19 is explained in detail.

Figure 10:
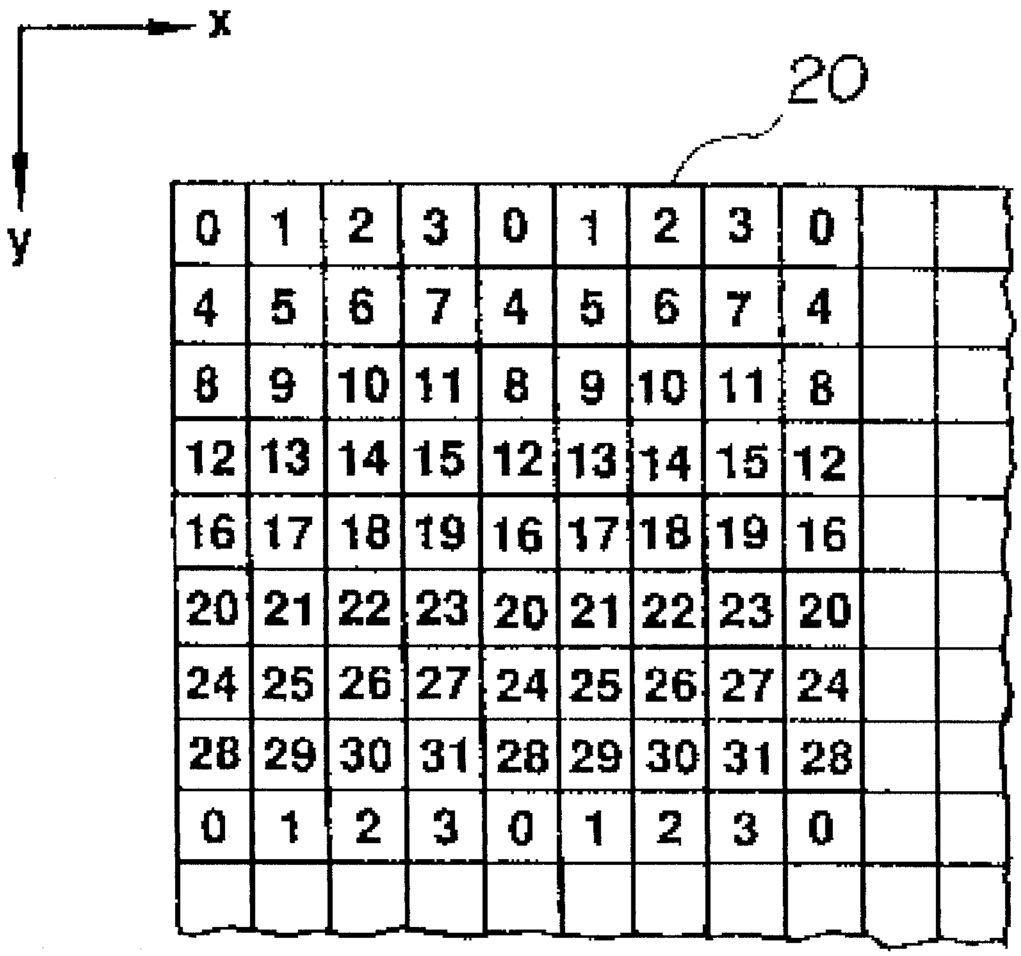
FIG. 10 shows relative positions of the pixels on the display screen controlled by each pixel processor constituting the picture memory apparatus shown in FIG. 9.
Figure 17:
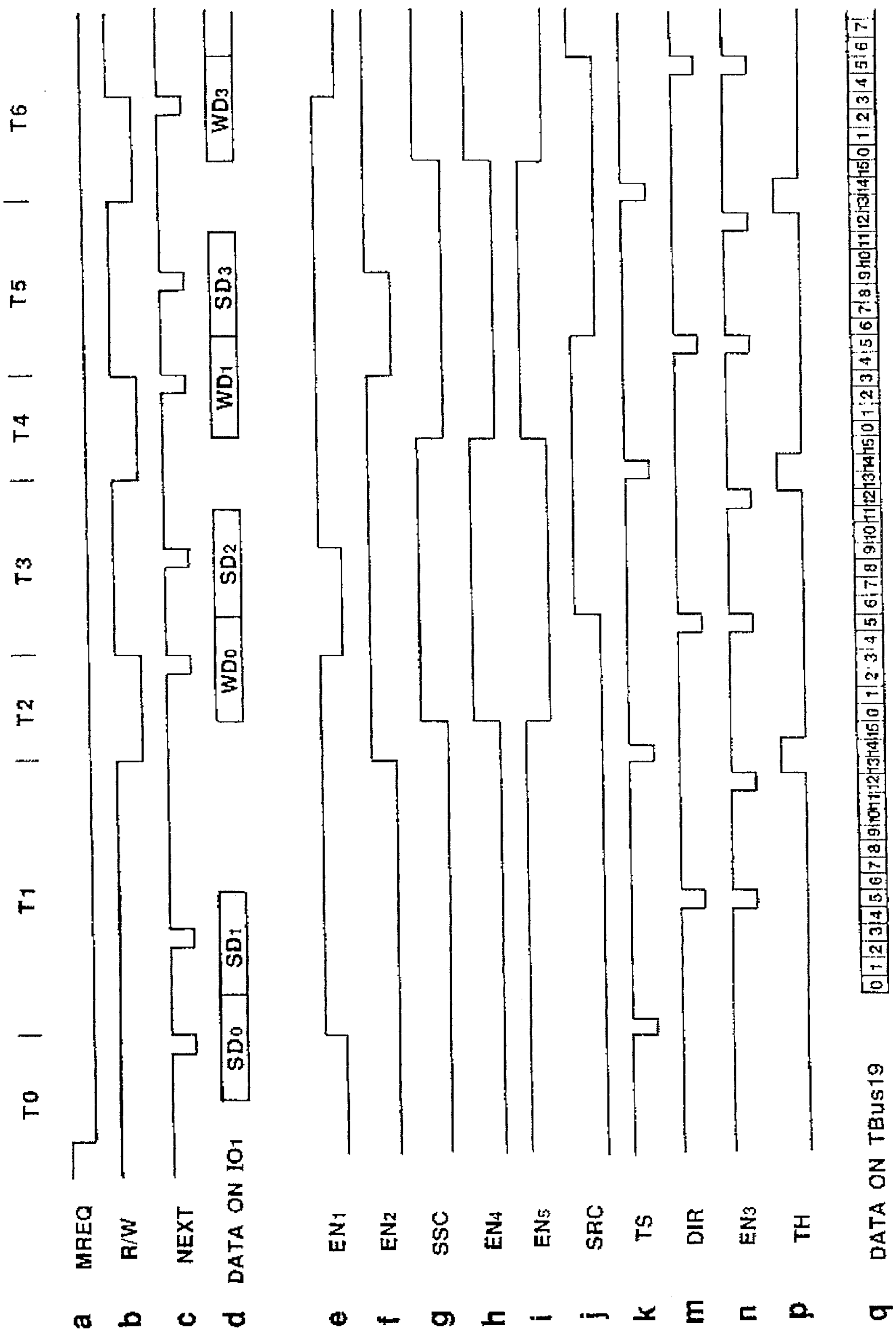
FIG. 17 is a timing chart for illustrating the operation of a BITBLT command not accompanied by logical operation.

With the BITBLT command not accompanied by the logical operation, accessing of memory $M_i$ is started by the low (L) level of a request signal MREQ supplied from sequencer 23 to memory controller 24, as shown at a in FIG. 17, while reading and writing of pixel data in and from memory $M_i$ are controlled by read/write signal R/W from memory controller 24, as shown at b in FIG. 17, so that, when the read/write signal R/W is at the H level, memory $M_i$ is in the read mode. Memory controller 24 sets the read/write signal R/W to an H level, while sequentially supplying readout addresses indicating the pixel positions of the source area 51 to memory $M_i$ for sequentially reading the source data $SD_0$, $SD_1$, $SD_2$, $SD_3$ . . . , as shown at d in FIG. 17. This reading is equivalent to the above-mentioned reading operation at the timings T0, T1, T3, T5 . . . shown in FIG. 15. Memory control let 24 sets the read/write signal R/W to the L level and sequentially transmits write addresses indicating pixel positions in the destination area 52 as later explained to memory $M_i$ for sequentially writing write data $WD_0$, $WD_1$, $WD_2$, . . . , as shown in FIG. 10*c*. This writing operation is equivalent to the writing operation at the above-mentioned timings T2, T4, T6, . . . On the other hand, memory controller 24 transmits a next signal NEXT indicating the timing of the next operation as a low-level signal to sequencer 23 to permit the next operation, as shown in FIG. 10*c*.

On the other hand, the buffers 42*a*, 42*b* of the main path circuit 21 are controlled in timed relation to the above-mentioned read/write signal R/W so that buffer 42*a* is rendered operative when the read/write signal R/H is at the H level and buffer 42*b* is rendered operative when the signal R/W is at the L level. When enable signals $EN_1$, $EN_2$ supplied from sequencer 23 are at L level, as shown at e, f in FIG. 17, registers 31*a*, 31*b* are enabled for writing, and alternately latch source data $SD_k$, read out from memory $H_i$ via buffer 42*a*, by clocks, not shown, which positively latch source data $SD_k$ from sequencer 23 shown at d in FIG. 17. That is, the source data $SD_0$, $SD_1$, $SD_2$, $SD_3$ . . . are latched alternately, similarly to the latching operation at the aforementioned timings T0, T1, T3, T5, . . .

The source data $SD_k$, thus alternately latched by registers 31*a*, 31*b*, are alternately selected by multiplexor MUX 33, so as to be outputted over TBus 19 via buffer 43*a* and input/output port $IO_2$. Specifically, multiplexor MUX 33 selects source data $SD_k$, k being an even number, from register 31*b* and source data $SD_k$, k being an odd number, from register 31*a*, when control signal SSC from sequencer 23 is at the L level or at the H level, respectively, as shown at g in FIG. 17, and outputs the selected source data $SD_k$ to TBus 19 via buffer 43*a* control led by controller 25.

TBus controller 25 causes the number of clocks corresponding to the data transfer rate on TBus 19 to be counted by the number j indicating the number of the pixel processor $XP_j$ of the destination area, with the L-level of the control signal TS controlling the start of data transfer supplied from sequencer 23 based on the aforementioned NEXT signal as a reference, as shown at k in FIG. 17. As soon as the counting is terminated, buffer 43*a* is rendered operative to effect the outputting of the source data $SD_k$ to TBus 19, which outputting is effected after the end of writing of the source $SD_k$ to registers 31*a*, 31*b* at the aforementioned timings T0, T1, T3, . . . Specifically, if the number i of the pixel processor $XP_i$ is 12 and the number j of the pixel processor $XP_j$ of the destination is 5, TBus controller 25 of the pixel processor $XP_i$ as indicated sets a control signal DIR controlling the direction of the input/output port $IO_2$ to L level within the time corresponding to the fifth time slot, of the transfer data on TBus 19, while setting enable signal $EN_3$ to the L level, thereby rendering buffer 43*a* operative to output source data $SD_k$ alternately latched by registers 31*a*, 31*b* at TBus 19 via multiplexor MUX 33 and buffer 43*a*, as shown at m, n in FIG. 17. Since data transfer for each pixel is completed each time a source data $SD_k$ is outputted, TBus controller 25 sets control signal TH to L level to supply the L-level signal to sequencer 23 to permit of the transfer of the next data as shown at p in FIG. 17.

Since each pixel processor $XP_i$ performs the above-described operation based on the number j of the pixel processor $XP_j$ of the destination, pixel data outputted from the pixel processor $XP_i$ of the originate are outputted at an array conforming to the sequence of the increasing numbers j of the pixel processor $XP_j$ of the destination. Meanwhile, the number shown at q in FIG. 17 corresponds to the above-mentioned number j.

The pixel data outputted over TBus 19 in this manner are received by each pixel processor $XP_i$ in the following manner.

Buffer 43*b* is also controlled by control signals DIR from TBus controller 25 and enable signal $EN_3$, so that, if the control signal DIR is at H level and enable signal $EN_3$ is at L level, buffer 43*b* is rendered operative. TBus controller 25 counts, with the L-level of the control signal TS from sequencer 23 as a reference, the number of clocks corresponding to the data transfer rate on TBus 19 by a number i of the pixel processor $XP_i$ of the associated pixel processor $SP_i$, and renders the buffer 43*b* operative at the time point the counting is terminated, thereby latching in registers 34*a*, 34*b* of the reception data $RD_k$ timed to the outputting at the TBus 19 of the source data $SD_k$ which is executed after the aforementioned timings T0, T1, T3 . . . Specifically, if the number i of the pixel processor $XP_i$ is 12, as mentioned above, TBus controller 25 sets the control signal DIR to H level at the time corresponding to the 12th time slot of the transfer data on the TBus 19, while setting the enable signal $EN_3$ to the L level to render buffer 43*b* operative, as shown at m, n in FIG. 17. Besides, TBus controller 25 alternately sets the enable signals $EN_4$, $EN_5$, supplied to registers 34*a*, 34*b*, to L level, as shown at h, i in FIG. 17, for alternately latching reception data $RD_k$ received over Tbus 19.

The source data $SD_k$, alternately latched by registers 34*a*, 34*b*, is alternately selected by multiplexor MUX 37. The selected reception data $RD_k$ are color-converted, if need be, so as to be stored in memory $M_i$ via logical operation circuit 41, register 45*c* and buffer 42*b*. Specifically, multiplexor MUX 37 selects reception data $RD_k$, k being an even number, from register 34*a*, and reception data $RD_k$, k being an odd number, from register 34*a*, when control signal SRC from sequencer 23 is at the L-level and at the H level, respectively, as shown at j in FIG. 17, and transmits the selected reception data $RD_k$ to shift register 38. Shift register 28 shifts the receptor, data $RD_k$ by a predetermined number of bits to supply the shifted data via register 45*a* to color converter 39. Color converter 39 converts, based on the lower most bit (LSB) of the shifted pixel data, the reception data $RD_k$ into the background color and foreground color when the LSB is 0 or 1, respectively, and transmits the optionally color-converted reception data $RD_k$ via register 45*b* to logical operation circuit 41. With the BITBLT command not accompanied by the logical operation, logical operating circuit 41 transmits the optionally color-converted reception data $RD_k$ directly to buffer 42*b* via register 45*c*. Buffer 42*b* is rendered operative in timed relation to writing into memory $N_i$, as mentioned above, and transmits the optionally color-converted reception data $RD_k$ as write data $WD_k$ to memory $M_i$. Memory $M_i$ stores the reception data $RD_k$, in a manner equivalent to writing at the aforementioned timings T2, T4, T6, . . .

The accessing timing of the memory $M_i$ and TBus 19 at the BITBLT command, accompanied by logical operation, is explained in detail.

Figure 18:
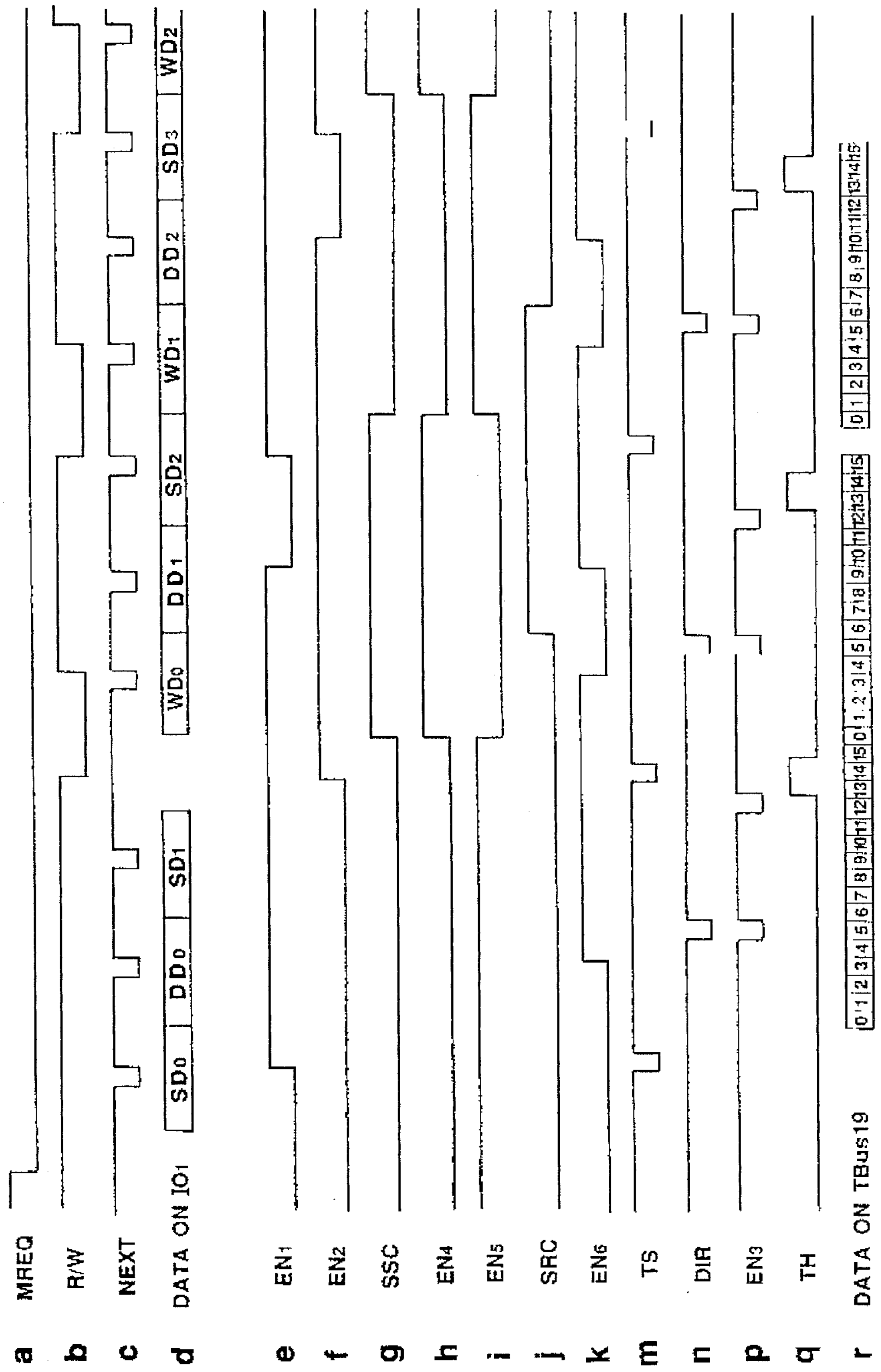
FIG. 18 is a timing chart for illustrating the operation of a BITBLT command accompanied by logical operation.

Similarly to the BITBLT command not accompanied by the above-mentioned logical operation, accessing of the memory Mi is started by the L-level of the request signal MREQ, as shown at a in FIG. 18, while reading and writing of pixel data in and from memory $M_i$ is controlled by read-write signal R/W, as shown at b in FIG. 18, so that, if the read/write signal R/W is at the H level, memory $M_i$ is in the read mode. Memory controller 24 sets the read/write signal R/W to H level, and transmits readout address indicating the pixel position of the source area 51 sequentially to memory $M_i$, so that, during the data transfer accompanied by logical operation, memory controller effects reading of source data $SD_0$, $SD_1$, $SD_2$, $SD_3$, in a manner equivalent to the reading operation at the timings T0, T2, T5, T8, . . . shown in FIG. 9, while sequentially supplying the readout addresses indicating pixel positions of the destination area 52 as shown at d in FIG. 18, for sequentially reading destination data $DD_0$, $DD_1$, $DD_2$, . . . in a manner equivalent to the readout operation of the pixel data at the aforementioned timings T1, T4, T7, . . . On the other hand, memory controller 24 sets the read/write signal R/W to the L-level, while sequentially transmitting write addresses indicating the pixel positions in the destination area 52 to memory $M_i$ for sequentially writing the write data $WD_0$, $WD_1$, $WD_2$ . . . in a manner equivalent to the writing operation at the aforementioned timings T3, T6, T9 . . . Memory controller 24 transmits to sequencer 23 the signal NEXT advising of the readout and write timings each time reading and writing are performed, as shown at c in FIG. 18.

On the other hand, buffers 42*a*, 42*b* of the main path circuit 21 are controlled in timed relation to the read/write signal R/W, so that the buffers 42*a*, 42*b* are rendered operative when the signal R/H is at the H and L levels, respectively. Registers 31*a*, 31*b* are allowed as to writing therein when the enable signals $EN_1$, $EN_2$ supplied from sequencer 23 are at the L level, as shown at e and f in FIG. 18, for alternately latching source data $SD_k$ read out from memory $M_i$ via buffer 42*a*. That is, alternate latching of the source data $SD_0$, $SD_1$, $SD_2$, $SD_3$, . . . corresponding to the latching operation at the aforementioned timings T0, T2, T5, T8, . . . is carried out sequentially.

On the other hand, register 40 is allowed as to writing therein when the enable signal $EN_6$ from sequencer 23 is at the L level, for sequentially latching the destination data $DD_k$ read out from memory $MN_i$, as shown at k in FIG. 18. That is, alternate latching of the destination data $DD_0$ , $DD_1$ , $DD_2$, $DD_3$, . . . corresponding to the latching operation at the aforementioned timings T1, T4, T7, . . . is carried out sequentially.

The source data $SD_k$, thus latched alternately by registers 31*a*, 31*b*, are alternately selected by multiplexor MUX 33, so as to be outputted at TBus 19 via buffer 43*a* and input/output port $IO_2$. Specifically, multiplexor MUX 33 selects source data $Sd_k$ from register 31*a* and source data $SD_k$ from register 31*b* when the control signal SSC from sequencer 23 is at the L and H levels, respectively, as shown at g in FIG. 18, and outputs the selected source data $SD_k$ to TBus 19 via buffer 43*a* controlled by TBus controller 25.

TBus controller 25 counts, with the L-level of the control signal, controlling the start of data transfer supplied from sequencer 23, as a reference, the number of clocks corresponding to the data transfer rate on TBus 19, by the number j indicating the pixel processor $XP_j$ of the destination, and renders buffer 43*a* operative on termination of counting, for effecting the outputting of the source data $SD_k$ to TBus 19, which outputting is performed after the end of the writing of the source data $SD_k$ in registers 31*a*, 31*b* at the aforementioned timings T0, T2, T5, T8 . . . If the number i of the pixel processor $XP_i$ is 12 and the number j of the pixel processor $XP_j$ of the destination is 5, TBus controller 25 sets the control signal DIR and enable signal $EN_3$ to the L-level, within a time interval the time corresponding to the fifth time slot of the transfer data on the TBus 19, as shown at m in FIG. 18, to render the buffer 43*a* operative to output source data $SD_k$ alternately larched in registers 31*a*, 31*b* at TBus 19 via multiplexor MUX 33 and buffer 43*a*. TBus controller 25 transmits a control signal TH advising the completion of data transfer for each pixel as a low level signal to sequencer 23 each time source data $SD_k$ is outputted, as shown at q in FIG. 18.

Each pixel processor $XP_i$ performs the above-described operation based on the number j of the pixel processor $XP_j$ of the destination so that the pixel data outputted from the pixel processor $XP_i$ of the destination are arrayed in the increasing order of the number j of the pixel processor $XP_j$ of the destination, so as to be outputted on the TBus 19 in this sequence, as shown at r in FIG. 18.

The pixel data outputted on TBus 19 in this manner is received by each pixel processor $XP_i$ in the following manner.

Buffer 43*b* is also controlled by control signals DIR from TBus controller 25 and enable signal $EN_3$, so that, if the control signal DIR is at H level and enable signal $EN_3$ is at L level, buffer 43*b* is rendered operative. TBus controller 25 counts, with the L-level of the control signal TS from sequencer 23 as a reference, the number of clocks corresponding to the data transfer rate on TBus 19 by a number i of the pixel processor $XP_i$ of the TBus controller, and renders the buffer 43*b* operative at the time point the counting is terminated, for latching to registers 34*a*, 34*b* of the reception data $RD_k$ timed to the outputting to the TBus 19 of the source data $SD_k$, which outputting is executed after the aforementioned timings T0, T1, T3 . . . Specifically, if the number i of the pixel processor $XP_i$ is 12, as mentioned above, TBus controller 25 sets the control signal DIR to H level within a time interval corresponding to the 12th time slot of the transfer data on the TBus 19, while setting the enable signal $EN_3$ to the L level to render buffer 43*b* operative, as shown at n, p in FIG. 18. Besides, TBus controller 25 alternately sets the enable signals $EN_4$, $EN_5$, supplied to registers 34*a*, 34*b* to L level, as shown at h, i in FIG. 11, for alternately latching reception data $RD_k$ received over Tbus 19.

The reception data $RD_k$, alternately latched by registers 34*a*, 34*b* in this manner, are alternately selected by multiplexor MUX 37, which is controlled by control signal SRC shown at j in FIG. 18, so that the selected data is supplied to shift register 38. The reception data $RD_k$ are optionally color-converted by shift register 38 and color-conversion circuit 39 so that the optionally color-converted reception data $RD_k$ are supplied via register 45*b* to local operation circuit 41.

The logical operation circuit 41 performs a logical processing between the pixel data of the destination area latched by register 40 and the optionally color-converted reception data $RD_k$ to generate new pixel data which are supplied as write data $WD_k$ to memory $M_i$ via register 45*c* and buffer 42*b*. That is, buffer 42*b* is rendered operative in timed relation to writing in the memory $M_i$, as mentioned above, to transmit new pixel data from logical operation circuit 41 as write data $WD_k$ to memory $M_i$ for storage therein in a manner equivalent to writing at the aforementioned timings T3, T6, T9.

Meanwhile, if the pixel processor $XP_j$ of the destination area, as found by the above formula (I), coincides with the pixel processor $XP_i$ of the originate, it means transmission to itself, in which case pixel processor $XP_i$ writes pixel data read out from memory $N_i$ in its own memory $M_i$ without transmission over TBus 19. Specifically, multiplexor MUX 36 is controlled to select pixel data from multiplexor MUX 35 and to reciprocate the pixel data read from memory $M_i$.

In this manner, each pixel processor $XP_i$ finds the number j of the pixel processor XPj of the destination area, and simultaneously effects readout of the pixel data from memory $M_i$ and transmission of the readout pixel data to TBus 19 in the increasing order of the number j, while simultaneously effecting reception of pixel data from TBus 19 and writing of the pixel data in memory $M_i$, so that, with the data transfer command, such as BITBLT command, high sped data transfer may be achieved even if the boundary of the source area 51 is not coincident with the boundary of the block $B_{x,\ y}$. In other words, accessing the memory $M_i$ and TBus 19 may proceed simultaneously so that data transfer may be achieved in substantially the same time as that for data transfer within its own memory $M_i$ for which data transfer between the pixel processors $XP_i$ is not necessary.

The readout address for each pixel processor $XP_i$ to read out pixel data from memory $M_i$ is explained.

Figure 19:
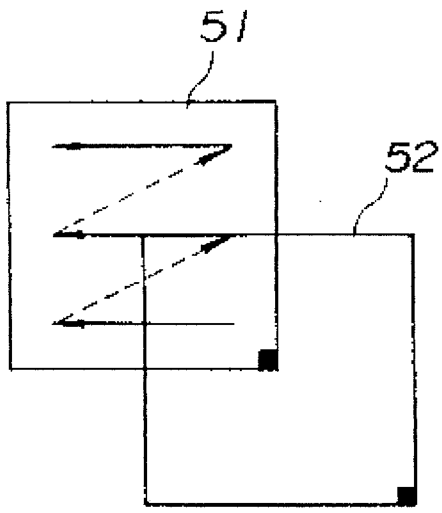
FIGS. 19 to 22 are diagrammatic views showing the source area and the destination area for illustrating the pixel transfer sequence in the data transfer command.

The transfer sequence on the display screen of source data $SD_k$ outputted on TBus 19 by each pixel processor $XP_i$ at each data command such as PIXBLT command is determined by the codes of the distances $D_{Xd}$, $D_{Yd}$ from the source area 51 up to the destination area 52. Thus, in order that pixel data of the source area 51 are not rewritten by new pixel data before transfer, data transfer is started at a 4×4 pixel block containing the right lower corner pixel, referred to as a start corner, of the source area 51, if $D_{Xd} \geqq 0$ and $DYd \geqq 0$, as shown in FIG. 19. It is noted that the above pixel block is different from the above-mentioned block $B_{x,\ y}$. Data transfer is performed from the start corner block sequentially to the left side block and then from the right corner block one line above towards the left side block.

Figure 20:
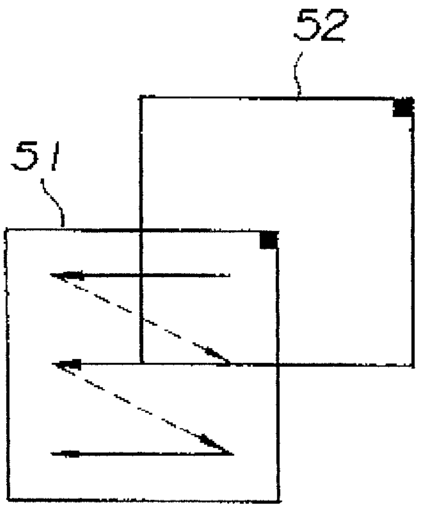

If $D_{Xd} \geqq 0$ and $D_{Yd} < 0$, data transfer is started from the right upper corner block of the source area 51 and proceeds from this start corner block sequentially towards the left side block and, after the end of the blocks of the line is reached, data transfer is performed sequentially from the right corner block one line below towards the left side block, as shown in FIG. 20.

Figure 21:
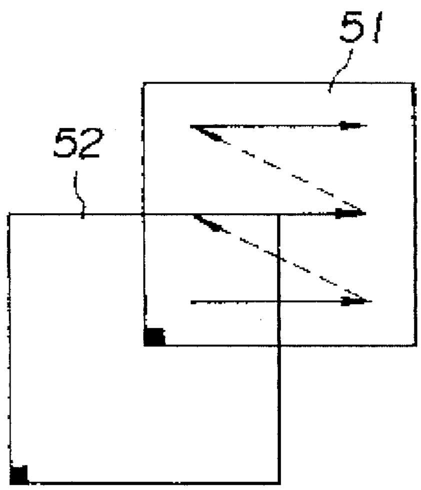

If $D_{Xd} < 0$ and $D_{Yd} \geqq 0$, data transfer is started from the left lower corner block of the source area 51 and proceeds from this start corner block sequentially towards the right side block and, after the end of the blocks of the line is reached, data transfer is performed sequentially from the left corner block one line above towards the right side block, as shown in FIG. 21.

Figure 22:
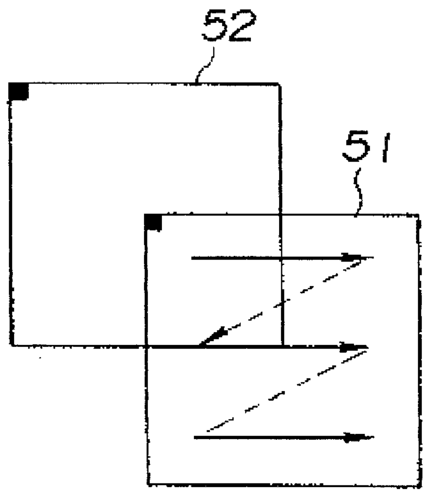

If $D_{Xd} < 0$ and $D_{Yd} < 0$, data transfer is started from the left upper corner block of the source area 51 and proceeds from this start corner block sequentially towards the right side block and, after the end of the blocks of the line is reached, data transfer is performed sequentially from the left corner block one line below towards the right side block, as shown in FIG. 22.

Specifically, each pixel processor $XP_j$ finds, on the basis of the coordinate values $(x_s, y_s)$ of a starting point of the source area 51 and its size W, H, the coordinate values of an end point $(x_e, y_e)$ $(=x_s+W-1,\ y_s+H-1)$ at the diagonally opposite corner of the starting point, and generates a readout address of the memory $M_i$ based on the sign of the distance $D_{Xd}$, $D_{Yd}$ up to the destination area 52 and these coordinates.

Figure 23:
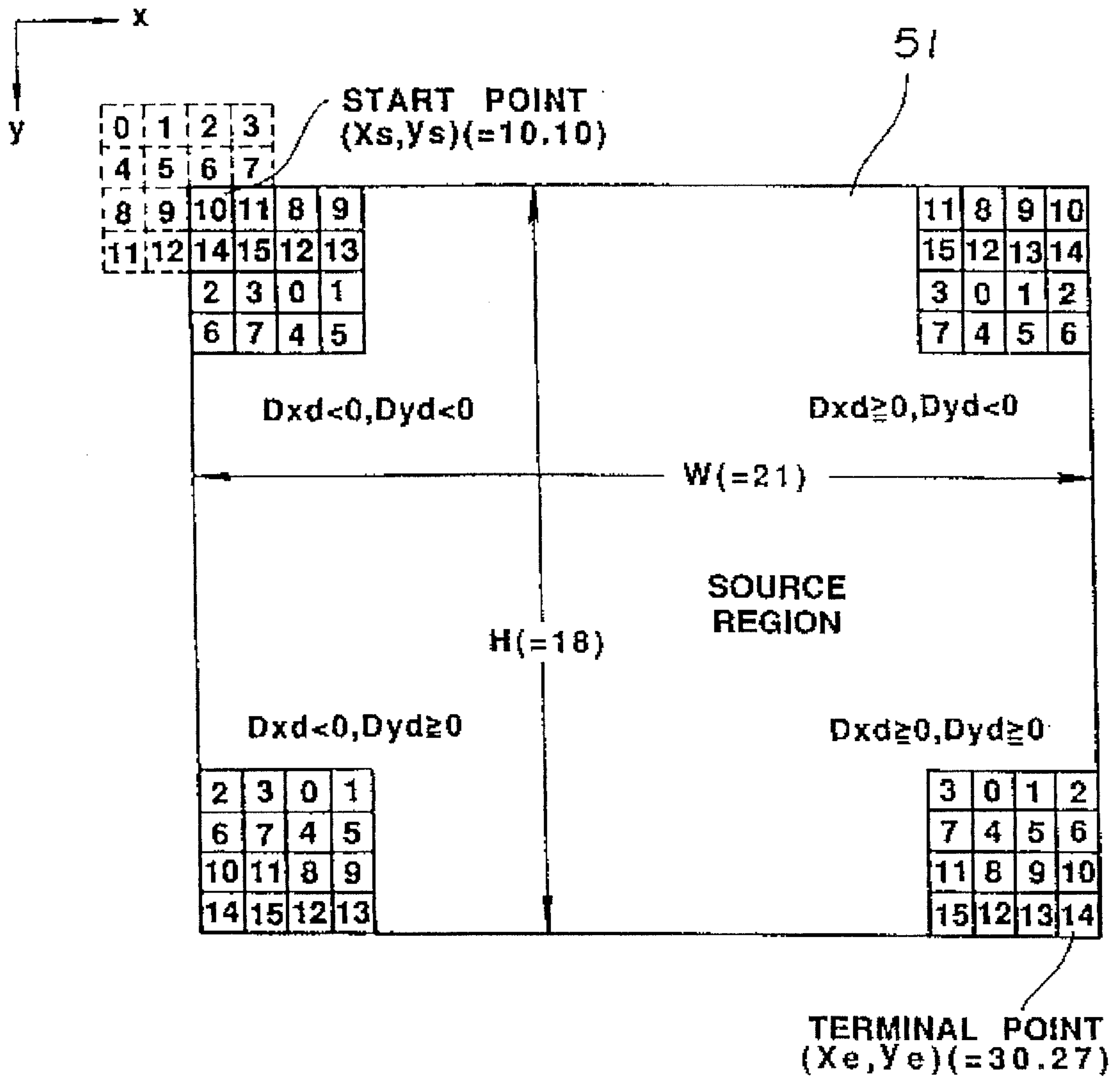
FIG. 23 is a diagrammatic view showing a source area for illustrating a start corner in the data transfer command.
Figure 24:
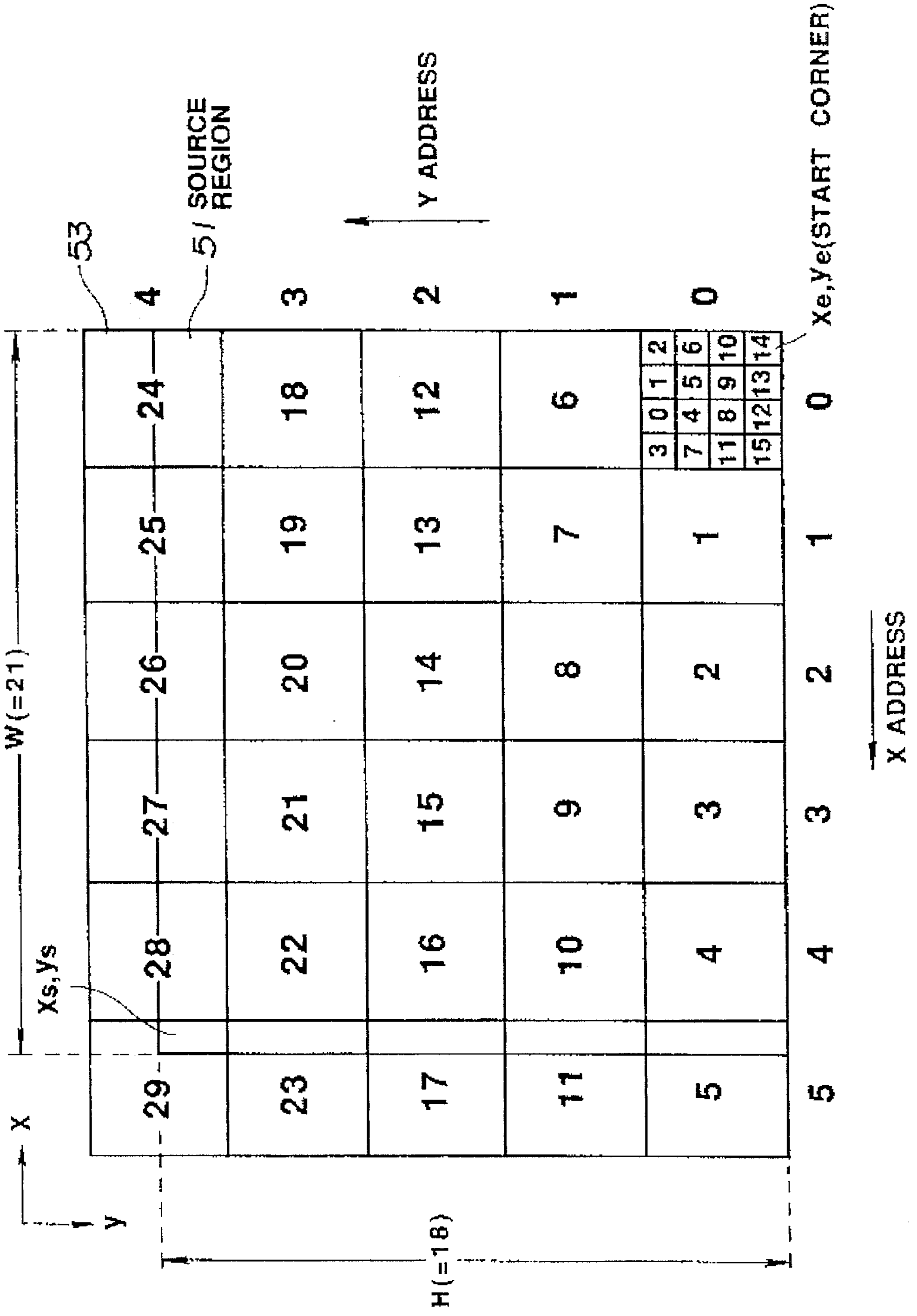
FIG. 24 is a diagrammatic view showing a source area for illustrating a readout address for memory $M_i$ constituting the picture memory unit.

If, as shown for example in FIG. 23, the number n of the pixel processors $XP_i$ is 16, the coordinate values of the starting point $(x_s, y_s)$ are (10, 10), and its size W, H are 21, 18, and if, when the coordinate values $(x_e, y_e)$ are (30, 27), $D_{Xd} \geqq 0$ and $D_{Yd} \geqq 0$, each pixel processor $XP_i$ divides the source area 51 into 4×4 pixel blocks having the terminal point as the start corner and having the terminal point as the point of origin, as shown for example in FIG. 24. The block addresses for discriminating these blocks are indicated as (X, Y) (X, Y=0, 1, 2, 3, . . . ). Therefore, these blocks differ from the blocks $B_{x,\ y}$ bounded by the number i as discussed in connection with the prior art, as shown in FIG. 13. Meanwhile, the start corners for $D_{Xd} \geqq 0$ and $D_{Yd} < 0$, $D_{Xd} < 0$ and $D_{Yd} \geqq 0$, $D_{Xd} < 0$ and $D_{Yd} < 0$ are also shown and each start corner is necessarily at an inner corner of the source area 51.

Each pixel processor $XP_i$ finds, at a block having a block address (X, Y) of $(_{0,\ 0})$ containing the start corner, the coordinate values $(x_0, y_0)$ on the display screen of the pixels under its control by the formula shown in Table 1

TABLE 1

| $Dx_d$ | $Dy_d$ | $X_o$ | $Y_o$ |
|---|---|---|---|
| ≧0 | ≧0 | $X_{eH} + (i \wedge 3H)$ | $Y_{eH} + (i>>2)$ |
| | | $X_{eH} + (i \wedge 3H) - 4$ | $Y_{eH} + (i>>2) - L$ |
| | <0 | $X_{eH} + (i \wedge 3H)$ | $Y_{eH} + (i>>2)$ |
| <0 | | $X_{eH} + (i \wedge 3H) - 4$ | $Y_{eH} + (i>>2) - L$ |
| | ≧0 | $X_{eH} + (i \wedge 3H)$ | $Y_{eH} + (i>>2)$ |
| | | $X_{eH} + (i \wedge 3H) + 4$ | $Y_{eH} + (i>>2) + L$ |
| | <0 | $X_{eH} + (i \wedge 3H)$ | $Y_{eH} + (i>>2)$ |
| | | $X_{eH} + (i \wedge 3H) + 4$ | $Y_{eH} + (i>>2) + L$ |

while finding, using the coordinate values $(x_0, y^0)$ as the reference, the coordinate values $(x_m, y_n)$ (m, n=0, 1, 2, . . . ) of the pixels under its control by the formula shown by the Table 2

TABLE 2

| $Dx_d$ | $Dy_d$ | $x_{m+1}$ | $y_{n+1}$ |
|---|---|---|---|
| ≧0 | ≧0 | $x_m + 4$ | $y_n - L$ |
| | <0 | $x_m + 4$ | $y_n + L$ |
| <0 | ≧0 | $x_m + 4$ | $y_n - L$ |
| | <0 | $x_m + 4$ | $y_n + L$ |

and, using the coordinate values $(x_m, y_n)$ as readout addresses, read out the pixel data of the respective pixels in the sequence of the block addresses (X, Y) of (0, 0), (1, 0), (2, 0), (3, 0), (4, 0), (5, 0), (0, 1), (1, 1), . . . , simultaneously for each of the blocks.

Meanwhile, symbols >>2 and ∧ indicate 2 bits shift to right and logical product, respectively, i, $x_{sH}$, $x_{eH}$, $y_{sH}$, $y_{eH}$, L, 3H, 4H are represented by the hexadecimal notation, $x_{sH}$, $x_{eH}$, $y_{sH}$, $y_{eH}$ are values obtained by the formulas 2 to 5

$$x_{sH}=x_s \wedge (\sim 3H) \quad (2)$$

$$x_{eH}=x_e \wedge (\sim 3H) \quad (3)$$

$$y_{sH}=x_s \wedge (\sim Ln) \quad (4)$$

$$y_{eH}=x_e \wedge (\sim Ln) \quad (5)$$

the values of L are 1H (1), 2H (2), 4H (4) and 8H (8) in association with the number n of the pixel processor $XP_i$ of 4, 8, 16 and 32, respectively, and selection between the formulas at the upper and lower parts of Table 1 is governed by the conditions shown by the following Tables 3 and 4.

TABLE 3

| $Dx_d$ | Conditions | Results |
|---|---|---|
| ≧0 | $(i \wedge 3H) \leqq (x_{eL} \wedge 3H)$ | Upper part of Table 1 |
| | $(i \wedge 3H) > (x_{eL} \wedge 3H)$ | Lower part of Table 1 |
| <0 | $(i \wedge 3H) \leqq (x_{eL} \wedge 3H)$ | Upper part of Table 1 |
| | $(i \wedge 3H) \geqq (x_{eL} \wedge 3H)$ | Lower part of Table 1 |

TABLE 4

| $Dy_d$ | Conditions | Results |
|---|---|---|
| ≧0 | $(i>>2) \leqq (y_{eL} \wedge Ln)$ | Upper part of Table 1 |
| | $(i>>2) > (y_{eL} \wedge Ln)$ | Lower part of Table 1 |
| <0 | $(i>>2) \leqq (y_{eL} \wedge Ln)$ | Upper part of Table 1 |
| | $(i>>2) < (y_{eL} \wedge Ln)$ | Lower part of Table 1 |

Meanwhile, these formulas 2 to 5 and Tables 3 and 4, symbols >>2, ∧ and ~ denote shift 2 bits left, logical product and negative logic i, $x_{sL}$, $x_{eL}$, $y_{sL}$, $y_{eL}$, Ln, 3H denote hexadecimal numbers and $x_{sL}$, $x_{eL}$ are lower 2 bits of $x_s$, $x_e$ obtained based on formulas 6 and 7

$$x_{sL}=x_s-x_{sH} \tag{6}$$

$$x_{eL}=x_e-x_{eH} \tag{7}$$

and $y_{sL}$, $y_{eL}$ are obtained from the formulas 8 and 9

$$y_{sL}=x_s-x_{eH} \tag{8}$$

$$y_{eL}=x_e-y_{eH} \tag{9}$$

and are lower 0th bit, lower 1st bit, lower 2nd bits and lower 3rd bit of $y_s$ and $y_e$ in association with the numbers n of the pixel processor $XP_i$ of 4, 8, 16 and 32, respectively. The value of Ln are 0H (0), 1H (1), 3H (3) and 7H (7), in association with the numbers n of 4, 8, 16 and 32 of the pixel processor $XP_i$, respectively.

Specifically, if assumed that the number n of the pixel processors $XP_i$ is 16, and the coordinate values $(x_s, y_s)$ of a starting point is (10, 10) that is (AH, AH) and its size is 21, 18, each pixel processor $XP_i$ finds the coordinate values $(x_e, y_e)$ as (30, 27) that is (1EH, 1BH). With $D_{Xd} \geqq 0$ and $D_{Dx} \geqq 0$, the pixel processors $XP_3$, $XP_7$, $XP_{11}$, $XP_{15}$ find the x coordinate in the block having the block address (X, Y) of (0, 0) of a coordinate $(x_0, y_0)$ on a display screen, employed as the readout address for memory $M_i$, as 1BH (27) from the formula $x_{eH}+i \wedge 3H>-4H$ shown in Table 1 because the formula $(i \wedge 3H)>(x_{eL} \wedge 3H)$ shown in Table 3 is satisfied. Similarly, pixel processors. $XP_0$, $XP_4$, $XP_8$, $XP_{12}$ find the x coordinate as 1CH (28) from the formula $x_{eH}+(i \wedge 3H)$ shown in Table 1 because the formula $(i \wedge 3H) \leqq (x_{eL} \wedge 3H)$ shown in Table 3 is satisfied. Pixel processors $XP_1$, $XP_5$, $XP_9$, $XP_{13}$ find the x coordinate as 1DH (29) from the formula $x_{eH}+(i \wedge 3H)$ shown in Table 1 because the formula $(i \wedge 3H) \leqq (x_{eL} \wedge 3H)$ shown in Table 3 is satisfied. Pixel processors $XP_2$, $XP_6$, $XP_{10}$, $XP_{14}$ find the x coordinate as 1EH (30) from the formula $x_{eH}+(i \wedge 3H)$ because the formula $(i \wedge 3H) \leqq (x_{eL} \wedge 3H)$ shown in Table 3 is satisfied.

On the other hand, pixel processors $XP_3$, $XP_0$, $XP_1$, $XP_2$ find the y coordinate of the coordinates $(x_0, y_0)$ as 18H (24) by the formula $y_{eH}+(i>>2)$ shown in Table 1 because the formula $(i>>2) \leqq (y_{eL} \wedge Ln)$ shown in Table 4 is satisfied. Pixel processors $XP_7$, $XP_4$, $XP_5$, $XP_6$ find the y coordinate of the coordinates $(x_0, y_0)$ as 19H (25) by the formula $y_{eH}+(i>>2)$ shown in Table 1 because the formula $(i>>2) \leqq (y_{eL} \wedge Ln)$ shown in Table 4 is satisfied. Pixel processors $XP_{11}$, $XP_8$, $XP_9$, $XP_{10}$ find the y coordinate of the coordinates $(x_0, y_0)$ as 1AH (26) by the formula $y_{eH}+(i>>2)$ shown in Table 1 because the formula $(i>>2) \leqq (y_{eL} \wedge Ln)$ shown in Table 4 is satisfied. Finally, pixel processors $XP_{15}$, $XP_{12}$, $XP_{13}$, $XP_{14}$ find the y coordinate of the coordinates $(x_0, y_0)$ as 1BH (27) by the formula $y_{eH}+(i>>2)$ shown in Table 1 because the formula $(i>>2) \leqq (y_{eL} \wedge Ln)$ shown in Table 4 is satisfied.

Each pixel processor $XP_i$ finds the coordinate values $(x_m, y_n)$ of other blocks by the formula shown in Table 2, with the coordinate values $(x_0, y_0)$found as above, as the reference. That is, each pixel processor $XP_i$ finds the coordinate values of the respective blocks $(x_m, y_n)$ by subtracting 4 from the coordinate value each time the value of the X coordinate of the block address (X, Y) is incremented by 1 and by subtracting L (herein 4) each time the coordinate value of the Y coordinate is incremented by 1 and reads out pixel data from memory $N_i$ with these coordinates $(x_m, y_n)$ as readout addresses.

On the other hand, storage of the received pixel data in memory $M_i$ is carried out based on the coordinates of the pixels of the destination area 52 on the display screen. That is, the coordinate values of each pixel of the destination area 52 is found by the formula similar to that for the readout address and, using these coordinate values as the write addresses, write the received pixel data. Meanwhile, pixel data not included in the source area 51 of the blocks having the block addresses (X, Y) shown in FIG. 24 of (5, 0), (5, 1), . . . (5, 4) and (0, 4), (1, 4) . . . (4, 4) are transferred between the pixel processors $XP_i$ without being written in memory $M_i$.

It will be seen from above that, in the graphic engine according to the present invention, each pixel processor $XP_i$ finds the number j of the pixel processor $XP_j$ of the destination and read out pixel data from memory $N_i$ at the same time that it transmits the read pixel data in the sequence of the increasing number j, while it receives pixel data from TBus 19 at the same time that it writes the pixel data in memory $M_i$, so that, if the boundary of the source area 5 is not coincident in the data transfer command, such as BITBLT command, with the boundary of the block $B_{x, y}$, data transfer can be performed speedily. In other words, accessing the memory $M_i$ and accessing TBus 19 can proceed simultaneously so that data transfer may be achieved within the same time as that for data transfer within the own memory $M_i$ is not necessary.

In the above-described embodiment, each pixel processor $XP_i$ of the originate finds the number j of the pixel processor $XP_j$ and transmits pixel data between the pixel processors $XP_i$ in the data transfer command such as BITBLT command in the order of the increasing number j, while pixel processor $XP_i$ at the receiver receives the data in the order of the increasing number i. However, it is also possible for the pixel processor $XP_i$ of the originate to transmit pixel data in the order of the increasing number i and for the pixel processor $XP_i$ of the receiver to find the number j of the pixel processor $XP_j$ to receive the data in the order of the increasing number j.

That is, each pixel processor $XP_i$ reads pixel data from memory $M_i$ at the same time that it transmits the pixel data to TBus 19 in the order of the increasing number i, while finding the number j of the pixel processor $XP_j$ of the originate and receives pixel data from TBus 19 at the same time that it writes the received data in memory $M_i$ in the order of the increasing number j, so that high speed data transfer may be achieved even if the boundary of the source area 51 is not coincident with the boundary of the block $B_{x,y}$. In other words, accessing the memory $M_i$ and accessing the TBus 19 may proceed simultaneously and data transfer may be made within substantially the same time as that for data transfer within own memory $M_i$ for which data transfer between pixel processors $Xp_i$ is not required.

It is seen from above that, in accordance with the present invention, the number of controlling means of the receiver of the pixel data is found in synchronism and pixel data read out via first input/output port from memory based on this number is supplied via second input/output port and bus to control means of the receiver while pixel data supplied from control means of the originate via bus and second input/output port are written in memory means via first input/output port to effect pixel data transfer between memory means, so that pixel data having an optional size on the display screen may be transferred at an elevated speed to any desired position on the display screen even although the memory interleave system is adopted.

On the other hand, pixel data read via first input/output port from memory means are supplied via second input/output port and bus to control means of the receiver, while the number of the receiver is found in timed relation thereto, and pixel data supplied from the control means of the originate via bus and second input/output port is written in memory means via first input/output port to effect data transfer between memory means, so that pixel data having an optional size on the display screen may be transferred at an elevated speed to any desired position on the display screen even although the memory interleave system is adopted.

What is claimed is:

1. A graphic engine apparatus, comprising:

a memory for storage of commands for picture processing;

a setup processor for sequentially reading out the commands stored in said memory for calculating parameters necessary for generation of pixel data;

a rendering processor for supervising data flow for graphic processing;

a pixel data generating circuit for generating pixel data responsive to parameters and commands for generating pixel data from said setup processor;

a pixel memory unit for storing pixel data from said pixel data generating circuit; and a video processing unit for converting pixel data read out from said pixel data generating circuit, said picture memory unit including, an n number of memory means each having a storage capacity equal to 1/n of a storage capacity corresponding to the resolution of a display screen, each of the memory means operative to store a pixel data;

an n number of control means each having first and second input/output ports for inputting and outputting the pixel data, the control means operative to control readout and writing of pixel data in and from said memory means via said first input/output port; and bus connection means for commonly interconnecting said second input/output port of each of said n number of said control means for transfer of pixel data between the control means, said n number of control means performing, in synchronism, a control operation of finding, from all of said control means, the number of control means to receive said pixel data, said control means also performing a control operation for supplying, via second input/output port and bus connection means to the control means to receive pixel data, pixel data read out from said memory means via said first input/output port and for causing the control means to receive said pixel data to write pixel data supplied thereto via said bus connection means and said second input/output port in said memory means via said first input/output port.

2. A graphic engine apparatus, comprising:

a memory for storage of commands for picture processing;

a setup processor for sequentially reading out the commands stored in said memory for calculating parameters necessary for generation of pixel data;

a rendering processor for supervising data flow for graphic processing;

a pixel data generating circuit for generating pixel data responsive to parameters and commands for generating pixel data from said setup processor;

a pixel memory unit for storing pixel data from said pixel data generating circuit; and a video processing unit for converting pixel data read out from said pixel data generating circuit, said pixel memory unit including an n number of memory means each having a storage capacity equal to 1/n of a storage capacity corresponding to a resolution of a display screen, each of the memory means operative to store a pixel data, an n number of control means each having first and second input/output ports for inputting and outputting the pixel data, the control means operative to control readout and writing of pixel data in and from said memory means via said first input/output port; and bus connection means for commonly interconnecting said second input/output port of each of said n number of said control means for transfer of pixel data between the control means, said n number of control means performing a controlling operation for supplying pixel data read out from said memory means via first input/output port and bus connection means to control means to receive said pixel data via said second input/output port and said bus connection means, said control means also performing, in synchronism, a controlling operation for finding the number of the control means from which the pixel data originated, and for causing control means to receive said pixel data to write in said memory means via said first input/output port the pixel data supplied thereto from the control means from which pixel data originated via said bus connection means and said second input/output port.

* * * * *